United States Patent
Early et al.

(10) Patent No.: US 9,080,708 B2
(45) Date of Patent: *Jul. 14, 2015

(54) AUTONOMOUS PIPELINE BUCKLE ARRESTING ISOLATION TOOL

(75) Inventors: Ciaran Early, Dublin (IE); Gary Murray, Dublin (IE); Raymond Honour, Kent (GB)

(73) Assignee: THE SAFER PLUG COMPANY LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/007,676

(22) PCT Filed: Mar. 31, 2011

(86) PCT No.: PCT/EP2011/055056
§ 371 (c)(1),
(2), (4) Date: Sep. 26, 2013

(87) PCT Pub. No.: WO2012/130320
PCT Pub. Date: Oct. 4, 2012

(65) Prior Publication Data
US 2014/0023440 A1   Jan. 23, 2014

(51) Int. Cl.
| | | |
|---|---|---|
| *F16L 57/02* | (2006.01) | |
| *F16L 1/235* | (2006.01) | |
| *F16L 55/128* | (2006.01) | |
| *F16L 55/34* | (2006.01) | |

(52) U.S. Cl.
CPC ............... *F16L 57/02* (2013.01); *F16L 1/235* (2013.01); *F16L 55/128* (2013.01); *F16L 55/1283* (2013.01); *F16L 55/34* (2013.01)

(58) Field of Classification Search
USPC ............. 405/168.2, 168.1, 168.3, 154.1, 158; 104/138.1, 138.2
See application file for complete search history.

(56) References Cited

U.S. PATENT DOCUMENTS

| | | | |
|---|---|---|---|
| 3,943,982 A | | 3/1976 | Lecordier |
| 5,293,823 A | | 3/1994 | Box |
| 5,685,668 A | * | 11/1997 | Justice .......................... 405/267 |
| 2005/0241710 A1 | * | 11/2005 | Early et al. ...................... 138/89 |
| 2007/0181341 A1 | * | 8/2007 | Segura et al. ................... 175/50 |
| 2008/0063478 A1 | * | 3/2008 | Reddy ........................ 405/154.1 |

FOREIGN PATENT DOCUMENTS

| | | |
|---|---|---|
| EP | 0367633 | 5/1990 |
| WO | 03/067134 | 8/2003 |
| WO | 2005/061944 | 7/2005 |

OTHER PUBLICATIONS

International Search Report dated Nov. 30, 2011.

* cited by examiner

*Primary Examiner* — Sean Andrish
(74) *Attorney, Agent, or Firm* — Hoffman & Baron, LLP

(57) ABSTRACT

A robotic unit for coupling to an internal buckle arresting pipeline isolation tool that is suitable for use in a pipeline that is being laid from a reeled pipeline vessel. The robotic unit having the ability to position the isolation tool either above or below the SAG bend or touchdown point of the pipeline. The robotic unit has first and second ends which are separable from each other and a hydraulic system having a plurality of pipeline engaging means positioned along an exterior surface of the robotic unit. The hydraulic system of the robotic unit being operable to returnably separate the first and second end of the robotic unit and to engage the pipeline engaging means with the interior surface of the pipeline. The robotic unit further comprising a control unit in communication with the hydraulic system to control the movement such that the robotic unit propels the isolation tool along the inside of a pipeline.

27 Claims, 22 Drawing Sheets

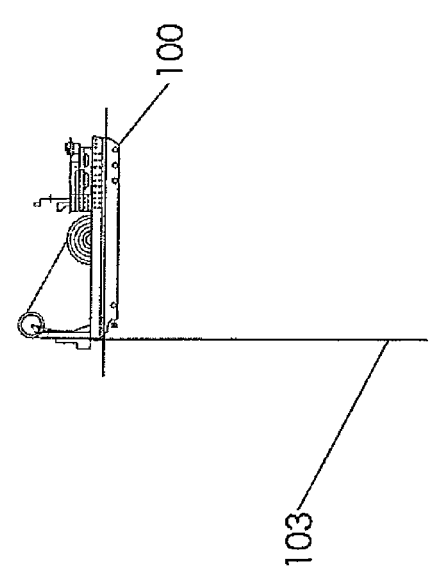
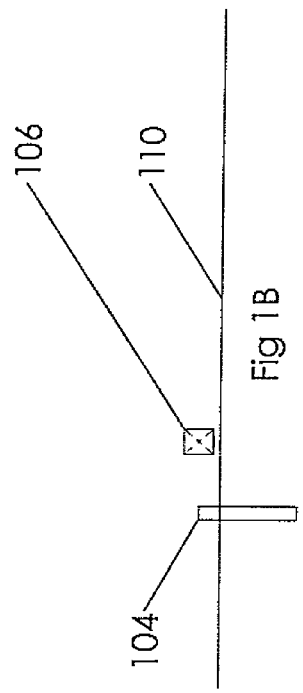

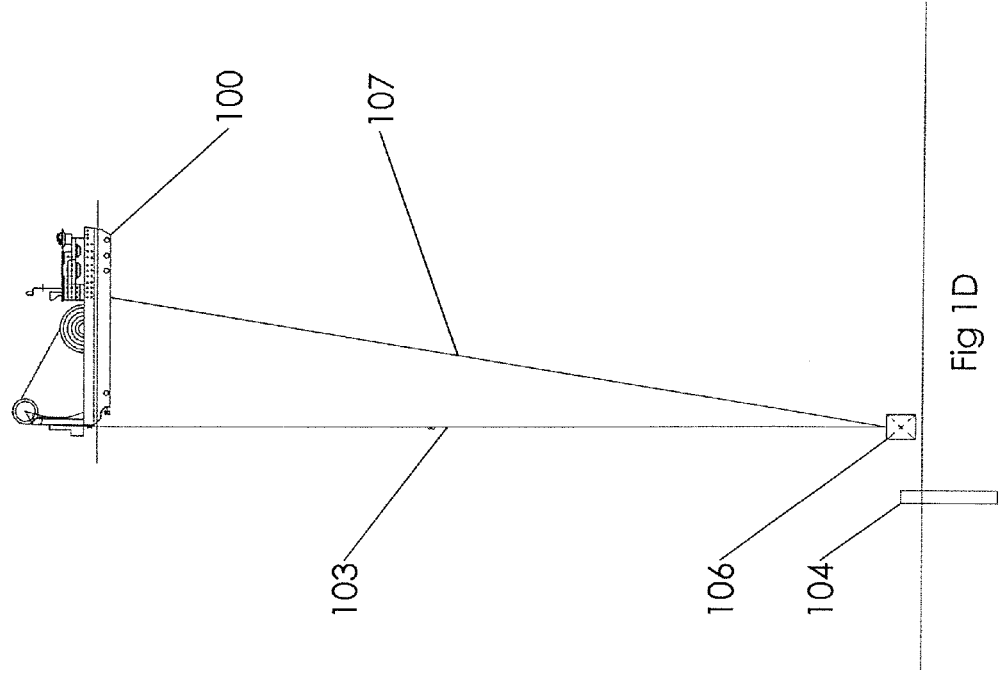
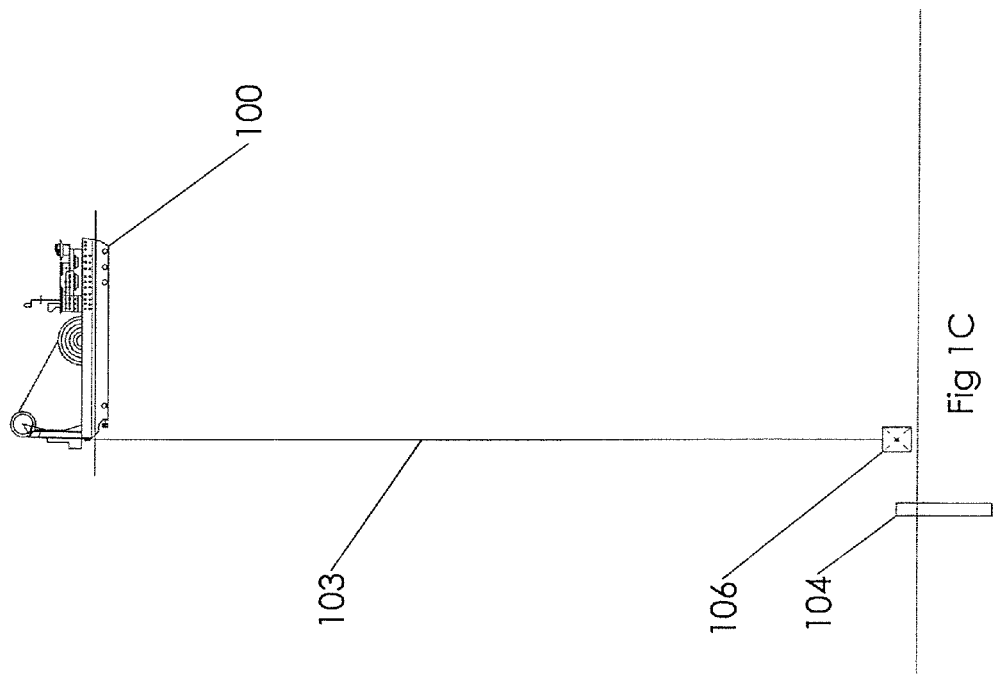

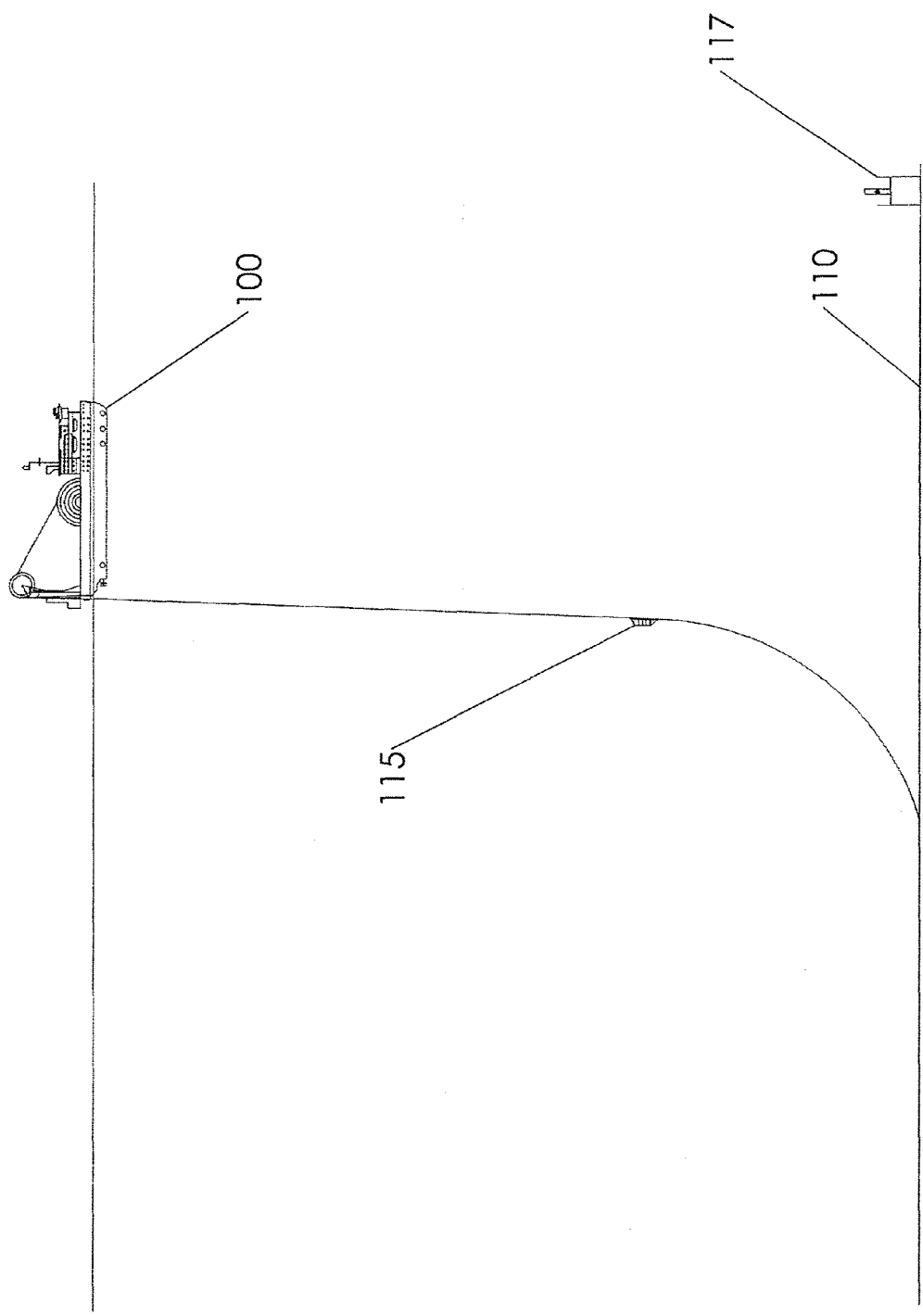

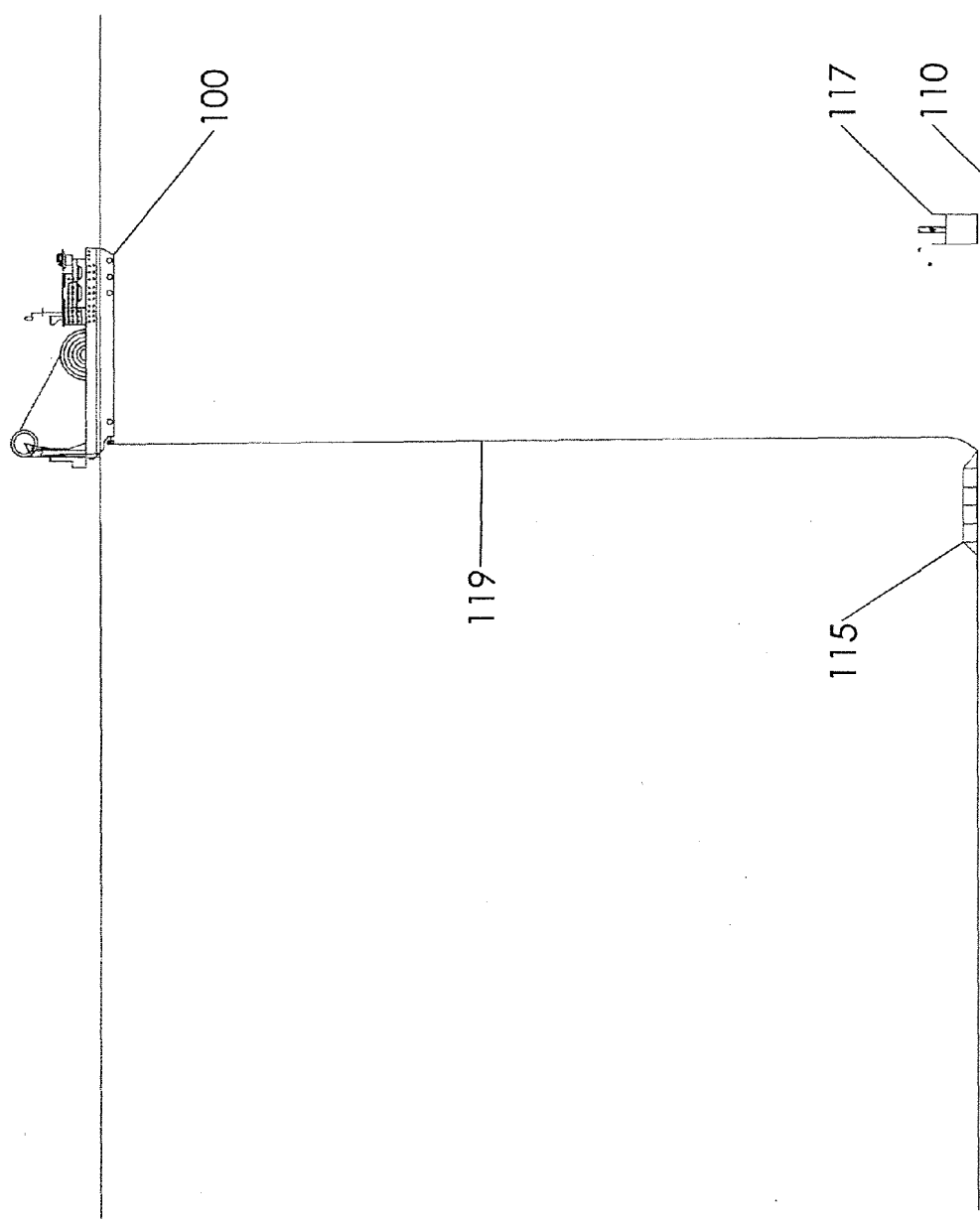

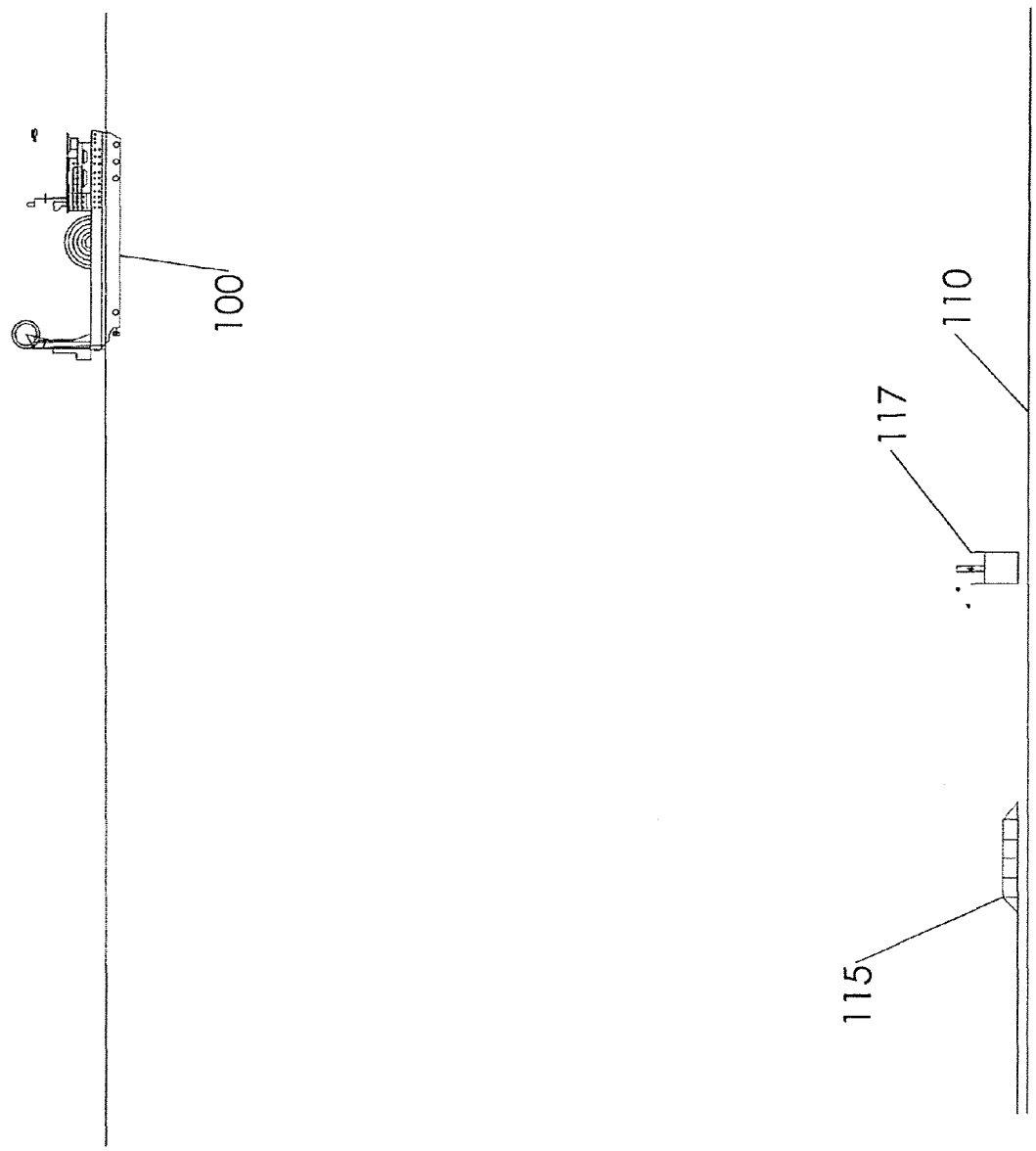

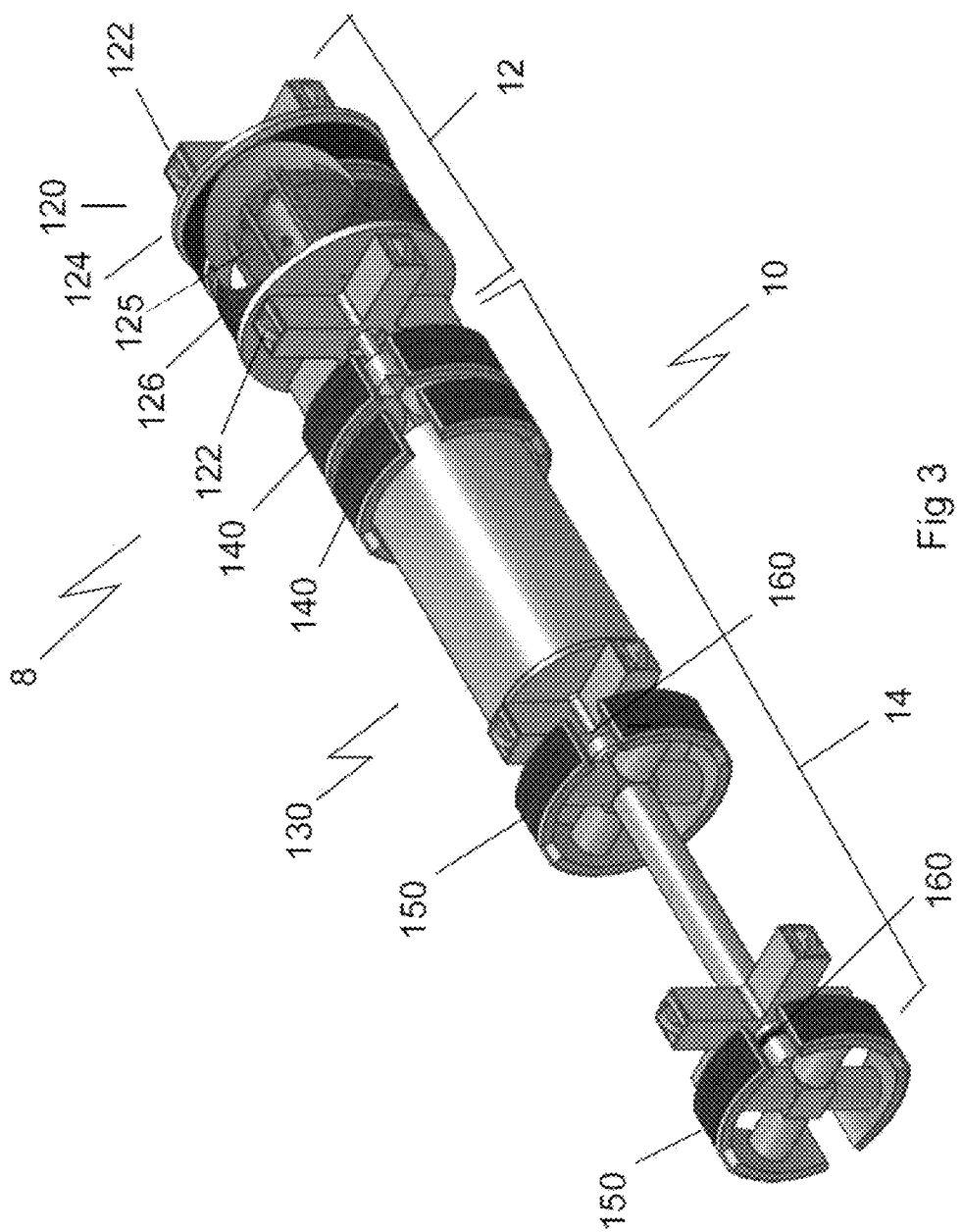

AUTONOMOUS PIPELINE BUCKLE ARRESTING ISOLATION TOOL

This application is the U.S. National Phase of, and Applicants claim priority from, International Patent Application Number PCT/EP2011/055056 filed 31 Mar. 2011, which is incorporated herein by reference.

FIELD OF THE INVENTION

The present invention relates to an autonomous pipeline isolation tool in particular to an autonomous pipeline isolation tool that is suitable for use as an internal buckle arrestor in a pipeline which is being laid from a reeled pipeline vessel.

BACKGROUND OF THE INVENTION

Traditionally, pipelines were welded together offshore and these were laid on the sea bed using the S lay method down a stinger from a lay barge. The lay barge then crabbed along the lay route using an eight legged anchor spread at a speed of approximately 1 mile or 1.6 km per day. Lay barges were superseded by large dynamically positioned lay ships, which embarked double jointed pipes. Up to seven joints of pipe were welded together concurrently on multiple weld stations on the lay-ship. The result of this operation was that the pipeline was installed much quicker, the speed of advance now being 5 to 8 kilometers per day. As water depths increased, the S lay method was replaced by the vertical J lay method.

Faster pipeline installation can be achieved using a reeled pipeline method. In this application the 12.2 meter joints of pipe are welded together onshore in "spool-bases" and configured into continuous lengths of pipe known as 'stalks' which are approximately 1 km long. Stalk sections of pre-welded pipe are then wound onto the lay vessel's reel, in a reeling and stalk welding process, to form a continuous 20 km length on the pipe-lay vessel. The reeled pipe-lay vessel then sails to the field, and during a suitable weather window, reels the 20 km pipeline section onto the seabed. The empty reeled pipe-lay vessel then sails back to the spool-base, embarks another 20 km section of pipe, sails back to field, picks up the end of the first 20 km section of pipe, connects it onto the second section of pipe, and reels the second section of pipe onto the seabed, thereby extending the pipe-lay to 40 km. The reeled pipe-lay vessel repeats this process, until the desired length of pipeline is achieved. The speed of advance using this method is typically 15-18 km per day.

'Safe' reeled pipe-lay is a complex operation, and many factors must be considered and planned for throughout the pipe-lay process. Issues regarding the pipeline material include material grade, tensile strength, pipe diameter, wall thickness, ability to weld the material, pipe weight, and the coatings used to cover the pipe line material to prevent corrosion are extremely important. Further factors include pipeline buoyancy; the resistance of the pipeline to corrosion and/or internal erosion, resistance to hydrogen sulphide, resistance to high internal pressures and/or high temperatures; the hydrostatic pressure the pipeline will be exposed to during the lay; the circumferential roundness of the pipeline and its deviation from same; the bending moment capacity of the pipeline and bending strains the pipe will endure during the lay process; the deflection and/or curvature of the pipeline during the lay process; and the ability to hold the pipeline when laying (the vessel's top tension capacity) all have a significant role in determining the outcome of the pipe-lay process. The vessel's top tension is a key issue when laying a pipeline using a reeled pipe-lay method.

Other factors which are significant during the pipeline laying process include the lay vessel; the reeled capacity; the lay rate; the lay-down tension; the seabed condition and whether or not the pipe surface is irregular; lay water depth; the reeled pipe-lay vessel hold back tension; whether or not a vortex induced vibration may occur; the safety factors during the pipe lay process and the accessories it will be laid with (pig launchers or receivers, Pipe Line End Terminations (PLETs), Pipe Line End Manifolds (PLEMs), in line Y branches, or in line Tees.

Offshore pipelines are being installed in increasingly deeper water depths and the following table gives a sample overview.

| Field name | Operator | Location | Water depth |
|---|---|---|---|
| Chinook Cascade | PetroBras | Gulf of Mexico | 2743 metres (9000 ft) |
| Independence | Anadarco | Gulf of Mexico | 2743 |
| Nakika | Shell | Gulf of Mexico | 2316 |
| Canyon Express | Total Fina Elf | Gulf of Mexico | 2195 |
| BlueStream | Saipem/KubanGazProm | Caspian Sea | 2150 |
| BC 10 | Shell | Brazil | 2000 |
| Thunder Horse | BP | Gulf of Mexico | 1856 |
| Greater Plutonio | BP | Angola | 1400 |
| Akpo | Total | Nigeria | 1375 |
| Gumusut | Shell | Malaysia | 1200 |
| Ormen Lange | Statoil | Norway | 1100 |

Offshore pipelines are at high risk of buckling during the initial laying operation. Most pipelines are laid containing an internal pressure of one atmosphere (1 Ata)

Tensioners on the pipe-lay vessel grip the pipeline being laid, by applying tension to the outside wall of the pipe. This gripping process can cause the circular shape of a thin walled pipe to alter and become more oval shaped. If the shape of the pipe is altered to an oval shape by as little as one wall thickness, the pipes resistance to buckling is reduced by as much as 40%. Consequently, much heavier walled pipe is used.

Other problems can also occur. Where a pipe meets the sea-bed, the pipe is subject to bending by its own weight, this occurrence is known as the SAG bend. The curvature at the SAG bend varies with pipeline lay tension. A buckle can start when tension forces at the SAG bend increase such that they cause the pipeline to bend where the natural curvature of the pipe is exceeded.

Once a buckle starts, it can propagate along a pipeline, flattening the pipeline until it reaches a buckle arrestor, a valve assembly, or shallower water, where the hydrostatic pressure exerting itself on the external pipeline wall is less than that of the buckling force.

The term 'propagating buckle' describes a phenomenon in which a buckle in an offshore pipeline changes its geometry from a transverse crease or dent to a longitudinal buckle and propagates along the pipe, causing the pipe to collapse along its length (or longitudinal axis). In a propagating buckle there are two distinct thresholds, the first threshold being the buckling pressure, which is the pressure at which a pipe under external pressure becomes unstable and buckles. The second threshold is the propagation pressure, which is defined as the lowest pressure at which an initiated buckle will propagate. The pressure required to maintain the propagating pressure, is less than the pressure required to initiate the buckle. Thus if a pipe buckles while subjected to an external pressure in excess of the initiation pressure, a propagating buckle will be formed that will advance along the pipe until a zone of less pressure is reached. When 'Propagating Buckles' occur, they follow a "fold up" U model, or dog-bone shape as they progress along a failing pipe.

Apart from during pipe lay installation activity, offshore pipelines which have a high outer diameter size to wall thickness relationship (OD to WT ratio) can buckle due to localised damage, whereby the damage is caused for example by dropped objects, anchor drags and/or seabed instability due to geological activity such as an earthquake.

Buckle arrestors have been used to safeguard a pipe against the catastrophic effects of a potential propagating buckle. There are a number of different types of buckle arrestors available, for example, one such buckle arrestor comprises full lengths or short sections of thicker pipe (thick walled rings), such arrestors are welded at periodic intervals into the pipeline being laid. Further examples of buckle arrestors include a thicker section of pipe wherein the section of pipe has an internal diameter that matches the external diameter of the pipe being protected. One or more of the thicker sections of pipe are clamped at periodic intervals onto the outside of the pipeline being protected. Alternatively, the buckle arrestor is slipped onto the pipeline and grouted during the lay process. Such buckle arrestors can only be used on lay barge type pipe-lay operations, as the pipe being laid from a reeled pipe-lay vessel does not have an end available to slip such arrestors over. The problem with a propagating buckle in a pipeline having a slip on, or bolted on external buckle arrestor is that the propagating buckle converts to a C shaped cross section, which passes through the arrestor. Slip on or bolted on buckle arrestors often cannot reach higher arresting efficiencies and their use in deep water is limited. Integrally welded heavy wall pipe joints make good buckle arrestors, but use of the heavier material introduces insurmountable reeling problems.

An example of a further buckle arrestor, is one made from fibre reinforced resins which are bonded to the pipeline exterior, after the pipeline is heated to 500F with an induction heater. Such buckle arrestors are made from spirally wound rods which are wrapped around pipelines. The ends of these rods are secured to the pipeline using common techniques known to the skilled person for example welding. The secured ends are then coated with a protective layer, usually cement before the pipe is laid.

Another type of buckle arrestor is a towed buckle arrestor. A towed buckle arrestor is pulled along inside the pipeline as the pipe is being welded and laid joint by joint. The buckle arrestor is secured using chains or wires to the lay-barge. The buckle arrestor cylinder is allowed to remain inside a section of pipe until that section reaches the sea-bed. Once the pipe touches the seabed the cylinder is pulled through to the open end of the next section of pipe. As each joint is laid, the cylinder is pulled along through the next joint. The problem with this method is that it does not lend itself to reeled pipe-lay, as there is no open end on the reeled pipe lay vessel.

Internal sleeves can be pre-installed inside the pipeline but these reduce the internal diameter of the pipeline and make it extremely difficult to pass an isolation tool such as a plug or a pigging tool.

A further example of a buckle arrestor is disclosed in the inventor's previous patent application WO 2005/028942. This device comprises a plurality of rubber wheels or tracks to engage with the interior surface of the pipeline to provide traction which enabled the device to move through the pipeline as desired by an operator. The problem with this device is that the reduced coefficient of friction in current internally coated pipelines, does not allow sufficient purchase to be attained by wheeled or tracked devices, which prevents the device from moving vertically up the pipeline as desired.

SUMMARY OF THE INVENTION

It is therefore an object of the present invention to provide a buckle arrestor isolation tool suitable for use with reeled pipeline vessels that will overcome the problems associated with known buckle arrestor isolation tools.

It is acknowledged that the term 'comprise' may, under varying jurisdictions be provided with either an exclusive or inclusive meaning. For the purpose of this specification, and unless otherwise noted explicitly, the term comprise shall have an inclusive meaning that it may be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

Further aspects of the present invention will become apparent from the ensuing description which is given by way of example only.

According to a first aspect of the invention there is provided a robotic unit for an internal buckle arresting pipeline isolation tool comprising;
  a first end and a second end, the first and second ends being separable from each other;
  a hydraulic system comprising at least one hydraulic piston and means for operating the piston, the hydraulic system being operable to returnably separate the first and second end of the robotic unit;
  the hydraulic system having a plurality of pipeline engaging means positioned along an exterior surface of the robotic unit, the pipeline engaging means being operable by the hydraulic system to be engagable with the interior surface of the pipeline;
  and a control unit, the control unit being in communication with the hydraulic system to control the movement of the pipeline engaging means and the first and second ends such that the robotic unit propels a pipeline isolation tool along the inside of a pipeline.

Accordingly, the present invention provides a robotic unit for an internal buckle arresting pipeline isolation tool as as described herein and illustrated in the figures.

In a further aspect of the invention, the control unit of the robotic unit is provided as a control pod which contains at least one microprocessor. In a preferred embodiment of the invention there are at least two microprocessors. In a further aspect of the invention the microprocessors are programmed with an embedded software program. In this way the control unit is programmed to control the movement of the hydraulic system through a pipeline transportation system. Conveniently this enables the hydraulic system of the invention to move or climb within the pipeline to the reeled pipe-lay vessel on the surface of the water if so desired. Alternatively the hydraulic system can move downwards from the lay vessel on the surface to the seabed in a controlled manner. Alternatively the hydraulic system can maintain a moving position in the vertical pipe string above the SAG bend if so required. In a further embodiment of the invention the control unit further comprises a communications module which enables the hydraulic ram system to utilize ELF communications. The advantage of this is that the robotic unit of the invention is completely autonomous.

In a further aspect of the invention the hydraulic system of the robotic propulsion unit is provided as two separate hydraulic ram systems.

In a further aspect of the invention each hydraulic ram system comprises a plurality of hydraulic rams, wherein at least one ram is an axial ram and at least one ram is a longitudinal ram wherein the axial ram and longitudinal rams are arranged such that they are perpendicular to one another.

In a further aspect of the invention each hydraulic ram system comprises at least nine rams wherein at least eight rams are axial rams and at least one ram is a longitudinal ram.

In a further aspect of the invention each of the axial hydraulic rams are arranged such that standard opposing forces principles enable each of the hydraulic rams to engage with the internal surface of the pipeline wall such that the robotic unit remains in position within the pipeline regardless of the inclination of the pipeline or whether or not the surface of the pipeline is coated.

In a further aspect of the invention each of the axial hydraulic rams are provided with a coated compression pad. This provides the compression pad with a surface which is tactile which promotes adhesion to the internal pipe wall surface. In one embodiment of the invention the compression pad is a rubber coated compression pad. In a further embodiment of the invention the compression pad is a threaded compression pad. It is understood that any suitable coating which is known to a person skilled in the art can be used.

In a further aspect of the invention the means for operating the hydraulic system comprises a pump for operating the rams and/or pistons, means for operating the pump, a plurality of fluid pipelines positioned between the pump and the hydraulic rams. The hydraulic system also comprises an accumulator positioned in parallel with the pump.

In a further aspect of the invention the hydraulic system is provided with one or more check valves and/or controllers which control the flow of hydraulic fluid around the hydraulic circuit to control the movement of the pipeline engaging means and the first and second ends such that the robotic unit propels in a controlled manner, a pipeline isolation tool along the inside of a pipeline.

In a further aspect of the invention the valves of the hydraulic system are arranged in such a way to achieve a triple redundancy fail safe unset system.

According to a further aspect of the invention the robotic unit is coupled to an internal buckle arrestor isolation tool comprising;
- a module having gripping and sealing members encircling the module in communication with a gas charged hydraulic system;
- a control unit in communication with one or more sensors and an actuator positioned within the isolation tool;
- the gripping and sealing members being movable between an unset position in which the gripping and sealing members are in an unexpanded configuration and a set position in which the gripping and sealing members are in an expanded configuration whereby the control unit operates an actuator to move the hydraulic piston such that the gripping and sealing members are moved between an unset position and a set position.

The pipeline isolation tool of the invention can be used as an internal buckle arrestor, thus the invention has the advantage of eliminating the requirement to weld buckle arrestors into the pipeline, or onto the outer diameter of the pipeline when it is being built or to clamp external buckle arrestors onto the outside of the pipeline, immediately before the pipeline is over-boarded from the reeled pipeline vessel.

A further advantage of the invention is that there is a reduction in required top tension capacity during pipe-lay. Thus the present invention allows pipe-lay vessels to operate nearer to their top tension ability without compromising vessel stability.

The present invention also has the added advantage that it eliminates stress raisers which are induced on a pipeline when it is reeled onto a pipe-lay vessel, particularly if it has buckle arrestors welded into the reeled pipe. The buckle arresting quality afforded by the isolation plug buckle arrestor of the invention, supports and bolsters the yield stress of the pipe, maintains the hydrostatic pressure integrity of the pipe, prevents the crossover pressure from propagating further along the pipe, thus confining the propagating buckle.

In a further embodiment of the invention the internal buckle arrestor isolation tool is provided with the means to achieve a rapid gripping and sealing process which together combine to halt the propagating buckle and stop water entering the pipe past the location of the sealed isolation plug. This enables buoyant dry pipe to be recovered from the seabed isolation point to the lay vessel.

In a further aspect of the invention the internal buckle arrestor isolation tool is a rapidly initiated isolation plug system whereby the setting mode is initiated by a gas charge having a high co-efficient of expansion whereby the isolation tool is capable of rapid expansion to grip and seal the pipe thereby preventing flooding of the pipeline.

According to a further aspect of the invention the internal buckle arrestor isolation tool will rapidly set in approximately 2.5 second. An example of such a charge is a $CO_2$ gas charge. Other expanding propellants known to a person skilled in the art can also be used.

In a further aspect of the invention, the hydraulic system comprises at least one hydraulic piston coupled to a plurality of fluid pipelines which are connected in a manner which enables the gripping and sealing members to operate to seal the pipeline. Optionally the hydraulic piston is selected from one of the following; gas energised, hydraulic energised or electrically energised hydraulic pistons.

In a further embodiment of the invention the hydraulic piston is selected from one of the following; a stored hydraulic accumulator driven hydraulic piston, or stored gas accumulator driven hydraulic piston or stored electric accumulator driven hydraulic piston.

In a further embodiment of the invention the actuator is selected from one or more of a high pressure gas, hydraulic or electric storage actuator positioned within the isolation tool in communication with the hydraulic piston of the hydraulic system.

In a further embodiment of the invention the sealing member comprises a suitable rubber packer known to a person skilled in the art.

In a further embodiment of the invention the gripping member comprises a suitable grip and packer geometry combination which is designed to keep the pipe's hoop and Von Mises stresses below 72% of Specified Minimum Yield Strength (SMYS).

Conveniently the buckle arrestor isolation tool and robotic unit can be located above the SAG bend, or touch-down point. Alternatively the hydraulic ram system coupled to the internal buckle arrestor isolation tool can be located below the SAG bend or touch-down point of the pipeline. The advantage of this is that the internal buckle arrestor isolation tool activates immediately to seal the pipeline being laid on detection of any change in hydrostatic pressure inside the pipeline being laid or on any detection of water inside the pipeline being laid.

Thus in the event of a wet buckle causing a catastrophic loss of buoyancy, if the buckle arrestor isolation tool is tracking above the SAG bend a potential wet buckle is limited to a dry buckle, for the pipeline below the buckle arrestor isolation tool location. Thus the robotic unit and pipeline buckle arresting isolation tool function to prevent flooding of the pipeline.

In a further embodiment of the invention the buckle arresting isolation tool and the robotic unit are made from a lightweight material which provides a high strength to weight ratio, for example, titanium. It is understood that any other suitable material known to a person skilled in the art could also be used.

Conveniently the buckle arrestor isolation tool and robotic unit of the invention operate in an autonomous environment without either an umbilical or tether attached to the housing of the invention.

In a further aspect of the invention the pipeline isolation tool comprises a wheeled mechanical isolation plug.

In another aspect of the invention the mechanical isolation plug is located at the front of the robotic unit.

In a further aspect of the invention the pipeline isolation tool is equipped with one or more detectors, selected from the group of pressure, moisture and/or differential detectors. Preferably all of the detector systems are provided with triple redundancy voting whereby in the event of any change or alteration to the prevailing condition, then a conditional change to any two out of each three sensors, will dictate a new status and the control unit of the pipeline isolation tool will react accordingly.

In a further aspect of the invention the hydraulic ram system is an engine driven system.

Conveniently the buckle arrestor is settable throughout the pipeline being laid including straight sections of pipe or straight tans and even in the SAG bend.

The buckle arrestor isolation tool system of the invention has the further advantage of enabling a pipeline being laid to be safely isolated from the lay vessel in a controlled manner. This is a precautionary feature that is useful in the event of a dead ship situation, loss of vessel power or similar emergency.

The robotic unit of the invention is further provided with a coupling mechanism which enables the robotic unit to connect to any one of a pipeline isolation tool, an internal buckle arrestor, or a pipeline gauging tool. The buckle arrestor isolation tool can also function as an emergency lay down head, or temporary weld cap for the laid down pipeline end.

Optionally in a further embodiment of the invention the hydraulic ram system of the invention is piggable to the pipe-line end if pushed by a chaser pig. A further advantage of the invention is that it eliminates the requirement to flood a pipeline, post lay, and to run a pig train, to conduct a qualification gauging run through the pipeline because the buckle arrestor isolation tool and the robotic unit of the invention can walk a gauge-plate through the entire length of the pipeline. It is to be understood that the robotic unit of the present invention is suitable to support any internal pipline tool required within the industry an example of other tools include a magnetic flux leakage train, a camera tool, a radiography tool, a hydrate buster, or as a pulling device for introducing fibre optic cables into old pipelines, or as an extraction tool without requirement to pig or flood a pipeline. A further advantage of the present invention is that in use it eliminates the requirement to flood, pig and hydrotest the pipeline prior to use. It also has the potential to eliminate the requirement to flood for hydrotest, dewater and then to vacuum dry the pipeline.

DESCRIPTION OF THE DRAWINGS

The invention will hereinafter be more particularly described with reference to the accompanying drawings which illustrate by way of example only, one embodiment of the buckle arrester isolation tool of the invention.

In the drawings;

FIGS. 1A to 1I showing the sequence of operations for laying a pipeline from a reeled pipe-lay ship;

FIG. 2 is a cross-sectional view of a pipeline having the buckle arrestor tool of the invention positioned in the riser section of the pipeline;

FIG. 3 is a perspective view of the buckle arrester tool of FIG. 2 with a pipeline isolation plug attached;

DETAILED DESCRIPTION OF THE INVENTION

Figure 1E:
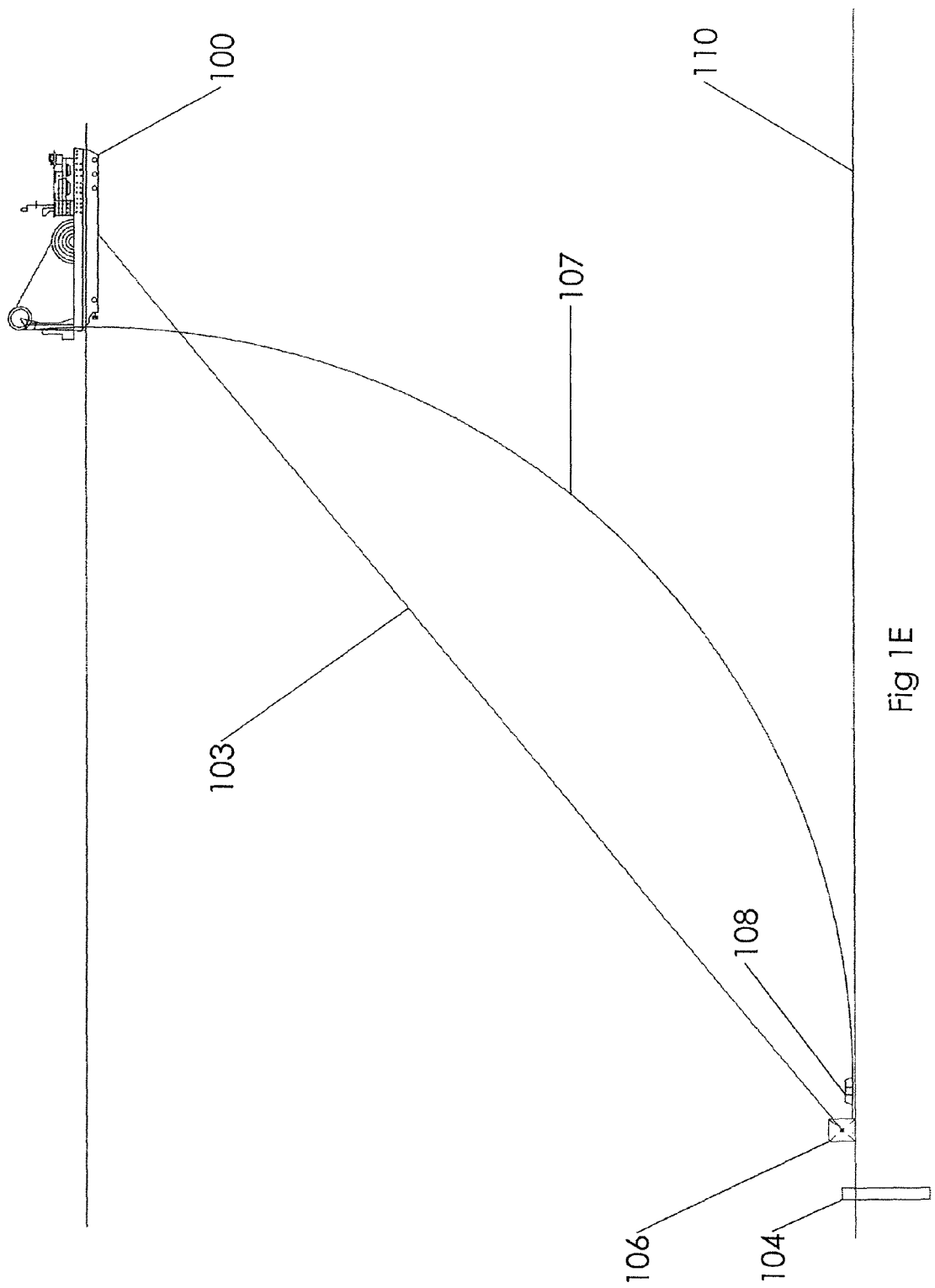

Referring initially to FIGS. 1A to 1I, there is shown a sequence of operations for laying a pipeline from a reeled pipe-lay ship. FIG. 1A shows a reeled pipelay ship 100 departing from a spool-base with pre-welded steel pipe spooled onto its drum 101. Although not shown in this figure, there is a 'pig' launcher installed on the start up head of the section of pipeline being laid. It is understood that a 'pig' launcher describes a known piece of equipment within the oil & gas industry (a pig trap) which is used to hold and launch a pig for example an isolation plug into a pipeline during or after the lay process.

Figure 1F:
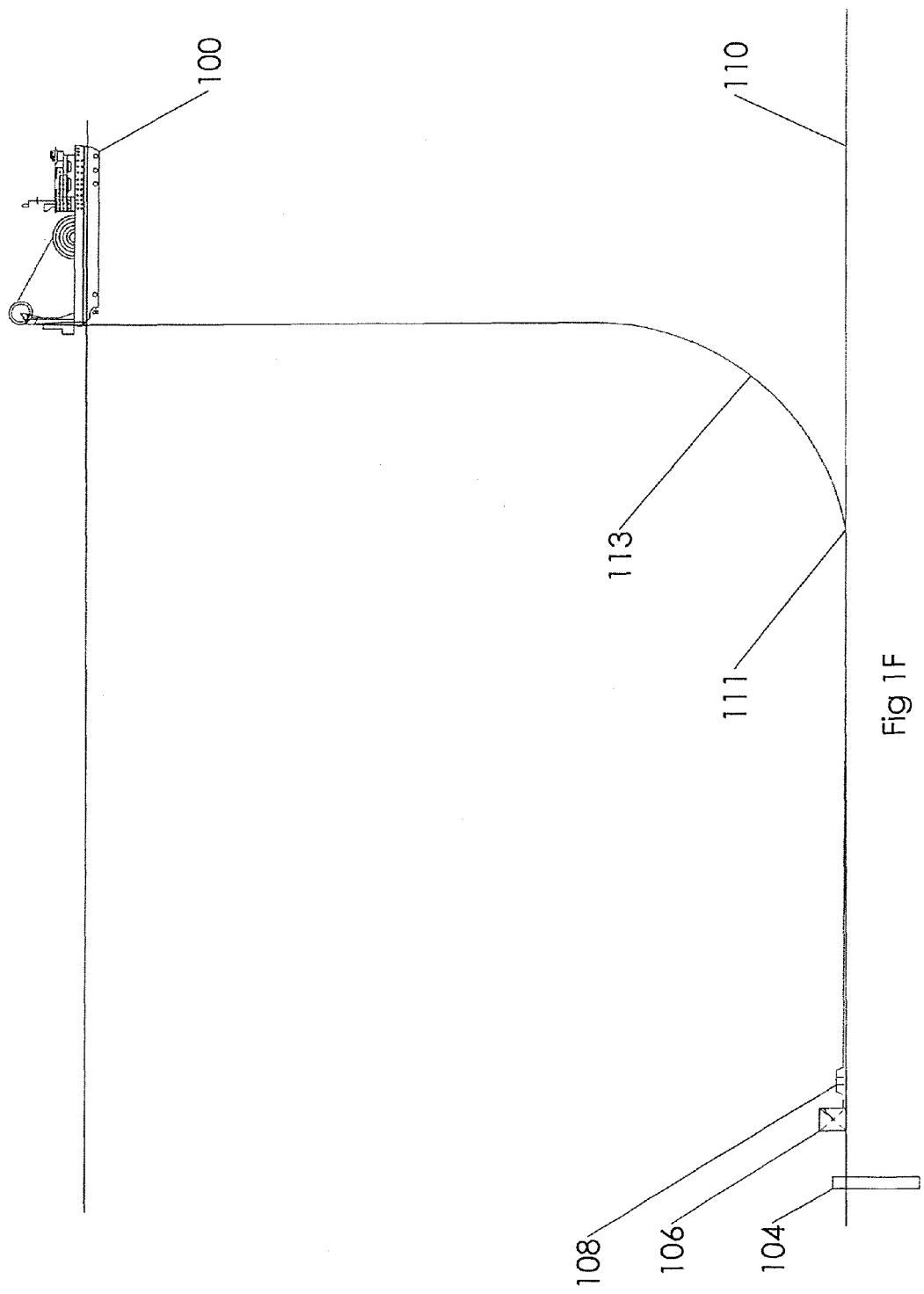

FIG. 1B shows the ship 100 arriving at its destination where it deploys a pull down wire 103 for connection to a start-up pile 104 or a Dead Man Anchor (DMA) 106. In this example the pull down wire 103 is pre-threaded through the DMA 106 sheave and this wire end 103 is then recovered back to the ship 100 as shown in FIGS. 1C and 1D. The pipeline end 107 is then pulled down to the seabed 110 with the pig launcher 108 attached which is then connected to the DMA 106. As shown in FIG. 1E, the pig launcher 108 is latched into the DMA and correct tension is established to enable start-up of the reeled pipe-lay operations. FIG. 1F shows the reeled pipelay ship laying the pipeline along the designated route. In particular, the vulnerable SAG bend 113 and touchdown 111 points are clearly shown. On completion of laying the reeled pipeline, the end of the pipeline with a pig receiver 115 installed therein is lowered to the seabed 110 using an abandonment and recovery wire 119 as shown in FIG. 1H. A subsea wellhead 117 is shown in FIGS. 1G and 1H. Once the pipeline end receiver has been lowered to the seabed, the abandonment and recovery wire 119 is disconnected and the reeled pipelay ship departs for the spool-base again.

Referring now to FIG. 2, there is shown a pipeline isolation tool 120 together with the robotic unit 10 of the present invention positioned in the riser section 16 of a reeled pipeline being laid in much the same way as has previously been described with reference to FIGS. 1A to 1I. In the embodiment shown, the pipeline isolation tool 120 is a rapid expansion plug which functions as a buckle arrestor.

Referring now to the remaining Figures, FIG. 3 is an enlarged perspective view of the pipeline buckle arresting isolation tool 120 together with the robotic unit 10 of FIG. 2. It is to be understood that the pipeline buckle arresting isolation tool could also be referred to as a 'buckle arrestor' 120. The pipeline buckle arresting isolation tool 120 is positioned to the front 12 of the device 8, whilst the robotic unit 10 occupies the rear 14 of the, wherein the term 'device' is used to describe the coupled pipeline buckle arresting isolation tool 120 and robotic unit 10. The buckle arrestor 120 has an actuator 125 positioned within and comprises a rapid expansion plug having a sealing member 124 and a gripping member 126. The sealing member 124 is any suitable sealing member known to a person skilled in the art that will achieve the required or desired effect. In this example, the sealing member 124 is a solid rubber packer which is oilfield proven. The gripping member 126 used is also any suitable gripping member known to a person skilled in the art. In this particular example, the gripping member 126 is designed to keep the pipe's hoop and Von Mises stresses below 72% of SMYS (Specified Minimum Yield Strength). The buckle arrestor 120 is made from suitable light-weight material which gives the tool high strength to weight ratios, examples of such light-weight material include titanium 6A1 4V or carbon fibre; however, any suitable material known to a person skilled in the art can be used.

In this embodiment of the invention, the buckle arrestor 120 is a rapid setting single module plug whereby the setting mode is initiated by a gas charge. This type of charge ensures that the buckle arrestor 120 is capable of rapid expansion to grip and seal the pipe thereby preventing flooding of the pipeline. The gas charge used has a high co-efficient of expansion, an example of such a charge is a $CO_2$ gas charge. Other expanding propellants known to a person skilled in the art can also be used.

The buckle arrestor 120 is further provided with a plurality of wheels 122 which are each set equidistant apart in a circular arrangement at the front and rear of the rapid setting single module plug. The wheels 122 are provided to assist the robotic unit 10 when moving the buckle arrestor 120 within a pipeline.

The robotic unit 10 is attached to the buckle arrestor 120 by means of a ball and socket joint. Although not shown in FIG. 3, it is understood that the robotic unit 10 could also have a standard sectored Gauge plate sized to meet the minimum pipeline qualification diameter. This is normally sized at 96% of pipe internal diameter. Ideally, the standard sectored Gauge plate is positioned at either end of the robotic unit 10 and the buckle arrestor 120.

Figure 4:
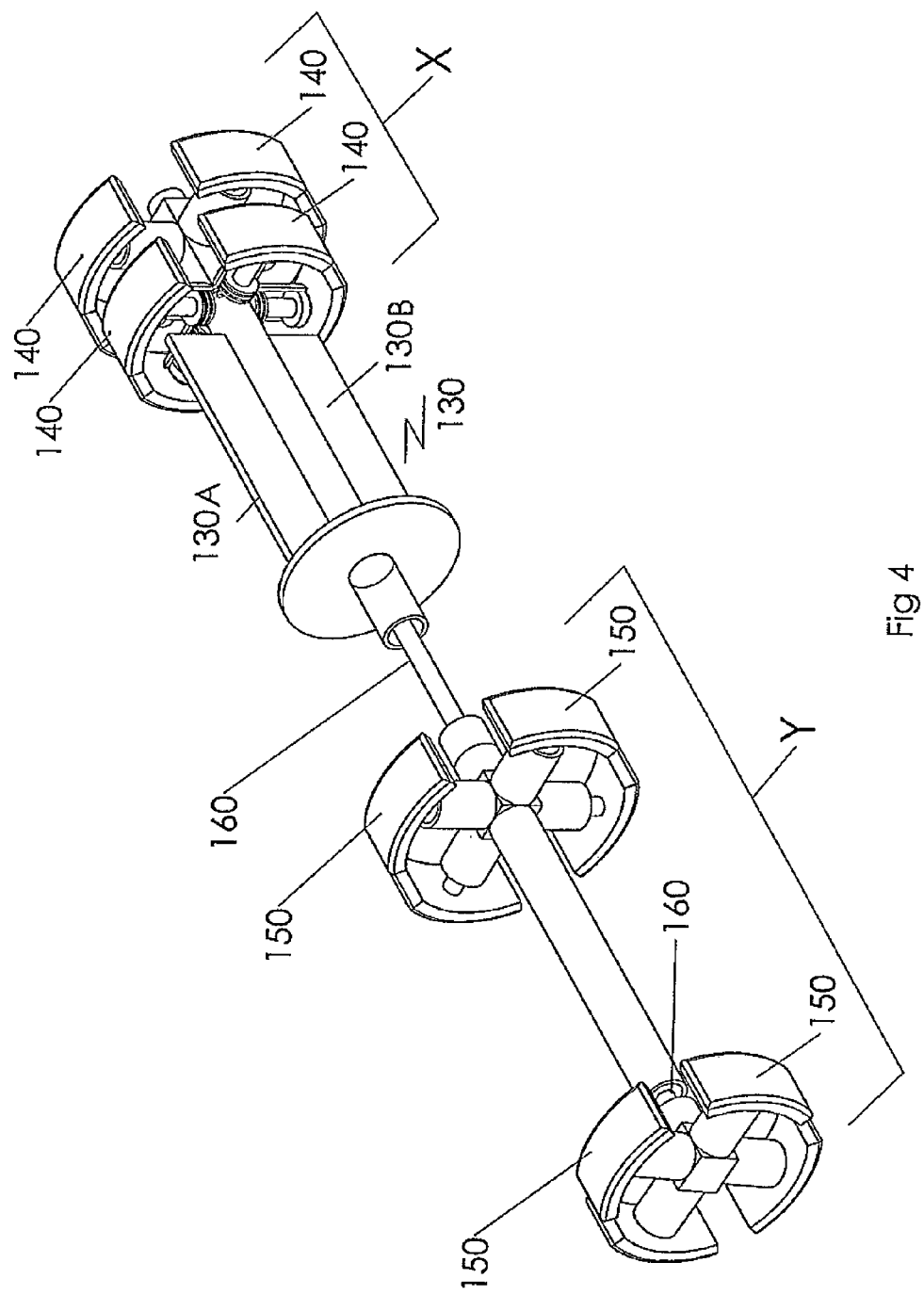
FIG. 4 is a perspective view of the buckle arrestor tool of FIG. 3 showing the primary and secondary drive systems of the invention.

The robotic unit 10 comprises a control pod 130 which houses a pair of embedded microprocessors (not shown) and two completely separate independent hydraulic ram systems, hereinafter referred to as System X and System Y as shown in FIG. 4. The components contained within the control pod 130 are housed in a one atmosphere (1 ata) pressurised housing.

Figure 5A:
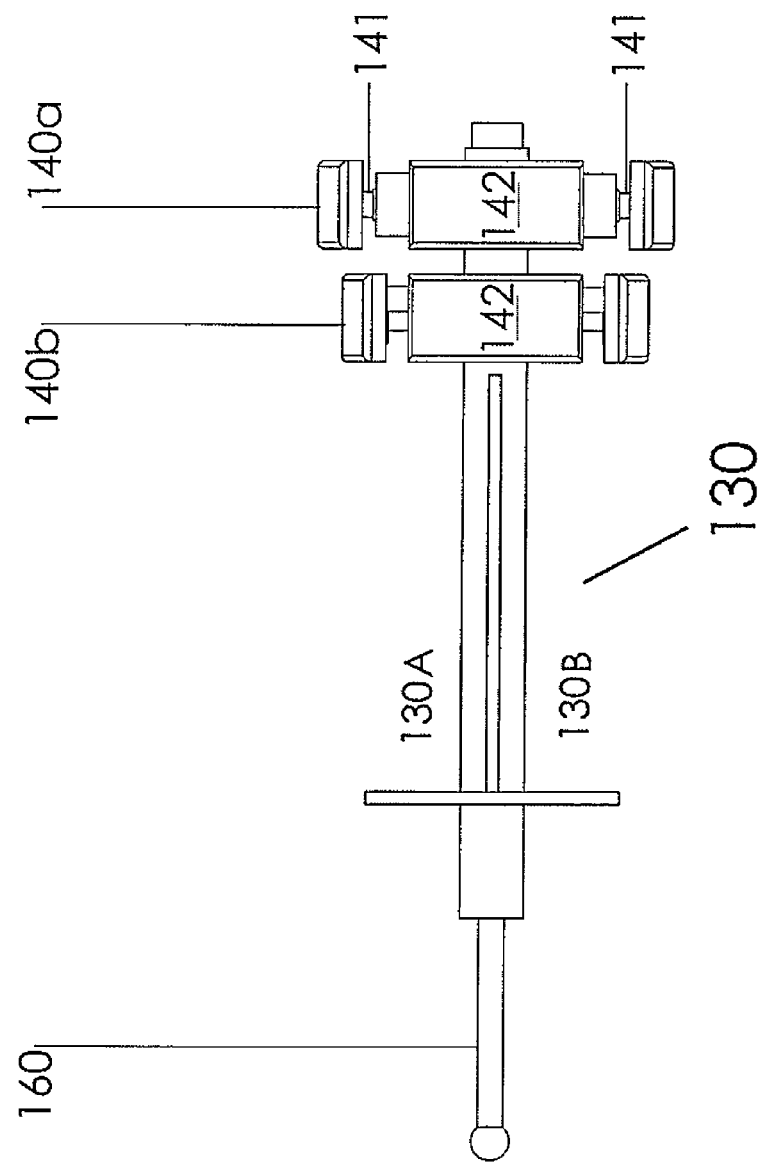
FIG. 5A is a side view of System A of the robotic unit of the buckle arrestor tool of FIG. 3.
Figure 5B:
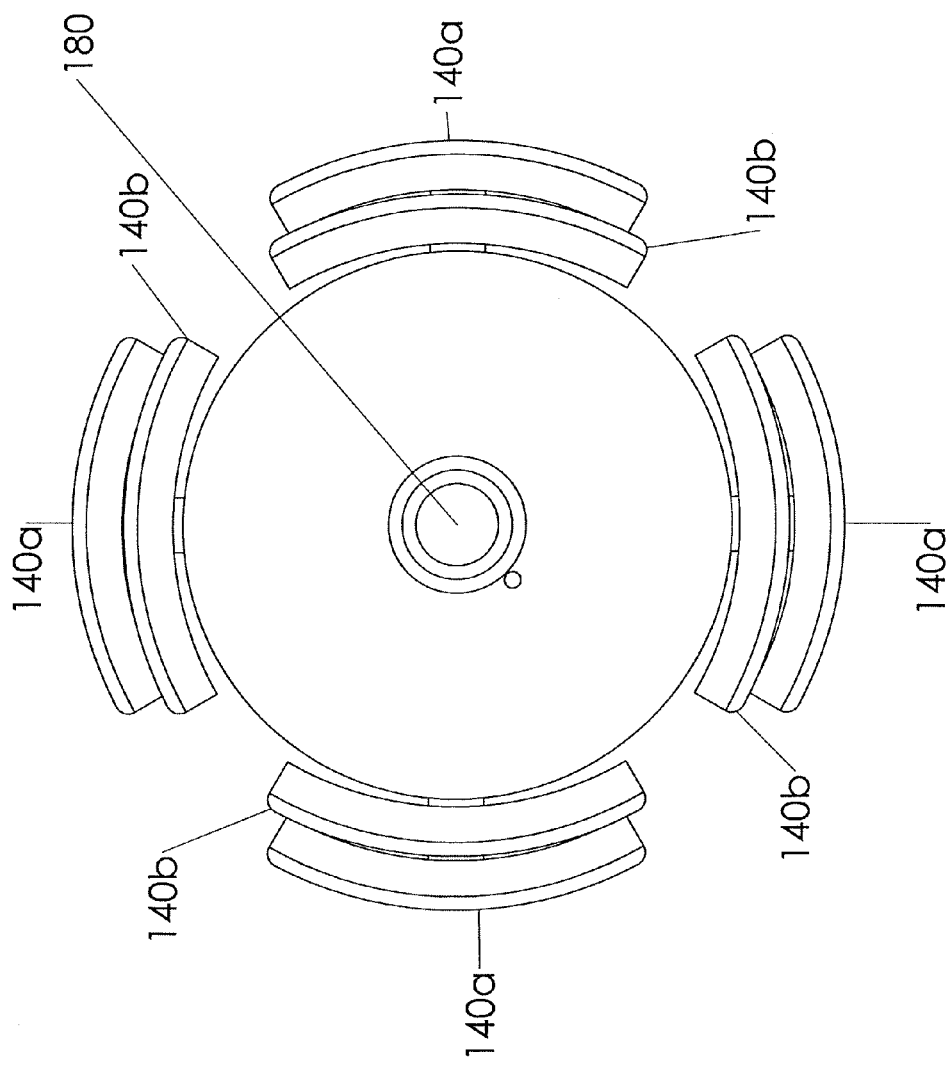
FIG. 5B is an end view of System A of FIG. 5A.

The robotic unit 10 tracks up or down the pipeline using the hydraulic ram systems X and Y. The robotic unit 10 can achieve this functionality even when the pipeline is in a fully vertical orientation, regardless of whether or not the internal wall of the pipeline is coated with a material having flow enhancing properties The embedded microprocessors control the engine of the robotic unit 10, which in turn drives the hydraulic ram systems X and Y using artificial intelligence (A.I.). In use, the microprocessors/artificial intelligence of the robotic unit 10 are nominated to side A 130A and side B 130B of the control pod 130 (see FIGS. 4 and 5A). The microprocessor at side A 130A of the control pod 130 has priority until point of failure of side A 130A. Failure of side A 130A is subject to a set of system self-diagnostics whereby the central processing unit 132 (FIG. 10) of the system diagnoses the status of various sensors and determines whether or not side A 130A is operating within predetermined parameters. In the event that side A 130A is operating outside the predetermined parameters then side A 130A fails and side B 130B takes control. The central processing unit 132 is provided with a self-diagnostics system for the robotic unit 10. A set of parameters or boundaries are provided which enable the central processing unit to determine when it is necessary and appropriate to allow side B 130B to take control.

Figure 10:
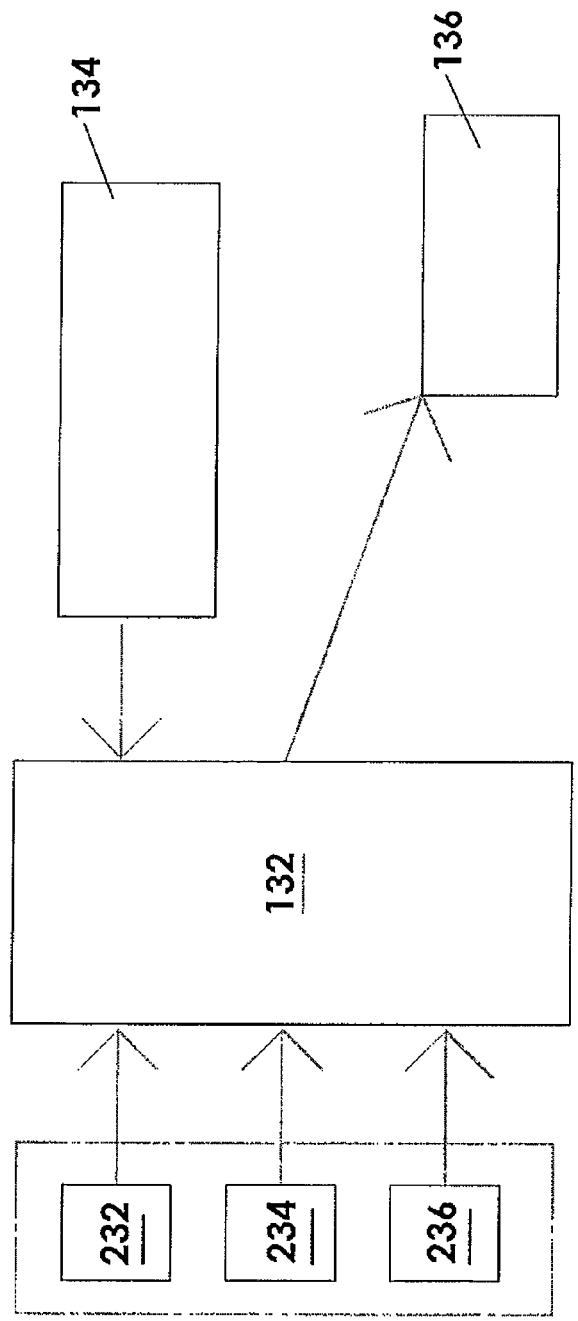
FIG. 10 is a flow diagram outline the functionality of the Central Processing Unit of the pipeline buckle arresting isolation tool.

Referring now specifically to FIG. 10, there is shown a flow diagram outlining the functionality of the central processing unit 132 of the invention. The buckle arrestor 120 is equipped with a number of various detectors which are connected to the central processing unit 132 within the control pod 130 and which are used to detect a leak in the pipe, such detectors include for example, pressure detectors 232, moisture detectors 234 and differential detectors 236.

In this embodiment of the invention the buckle arrestor 120 is provided with three pressure transmitters each of which are monitoring the pipe pressure. The pressure detectors 232 will react when an increase in pressure is detected. The buckle arrestor is also provided with three dewpoint sensors 234 which monitor the moisture content within the pipe. The dewpoint sensors 234 also monitor water ingress. The buckle arrestor is further provided with three microbar riser sensors 236 which read the internal pressure gradient up the riser. The microbar sensors 236 detect any radical change in internal pressure.

Each of the detectors 232, 234 and 236 are integrated into a voting mechanism which is linked to a control pod on the robotic unit 10. On detection of two out of three of a combination of detected rises indicating a leak the central processing unit 132 immediately sends an output signal 136 which causes the buckle arrestor 120 to be set rapidly by the activation of the gas charge, this in turn causes a piston to rapidly deploy, the gripping member 126 sets and engages the inner pipe wall, while concurrently moving the solid rubber packer or sealing member 124 outwards, to compress radially onto the inner pipeline wall thereby rapidly sealing the pipeline.

The central processing unit 132 is also monitoring continual ongoing feedback 134 from various other sensors including pressure transmitters placed on the segmented axial compression pads 142, 152, proximity sensors and inclinometer which monitors altitude and an odometer which monitors the distance traveled by the robotic unit and/or isolation tool.

Referring now to FIGS. 4 to 8B, the robotic unit 10 moves upwards and downwards within the pipeline as desired by means of the hydraulic ram systems X and Y. The hydraulic ram systems X and Y are configured to allow full redundancy for each ram system X and Y and to allow either ram system X or Y to drive the operation. Although not shown, each of system X and system Y has separate system pressure vessels, separate sensor system for all hydraulic rams and pads, separate sensor systems for orientation and attitude, separate command systems, separate control systems, separate sequencer systems, separate battery systems, separate power train systems and separate ELF through pipe wall communications systems.

Hydraulic ram systems X and Y each comprise a nine unit hydraulic ram engine system. The hydraulic ram systems X and Y are provided with eight segmented axial rams 140 and 150 respectively which are configured to provide maximum grip against the pipeline wall and a ninth longitudinal ram 160 which is positioned perpendicular to the eight segmented axial rams 140 and 150.

Figures 5C, 5D, 5E:
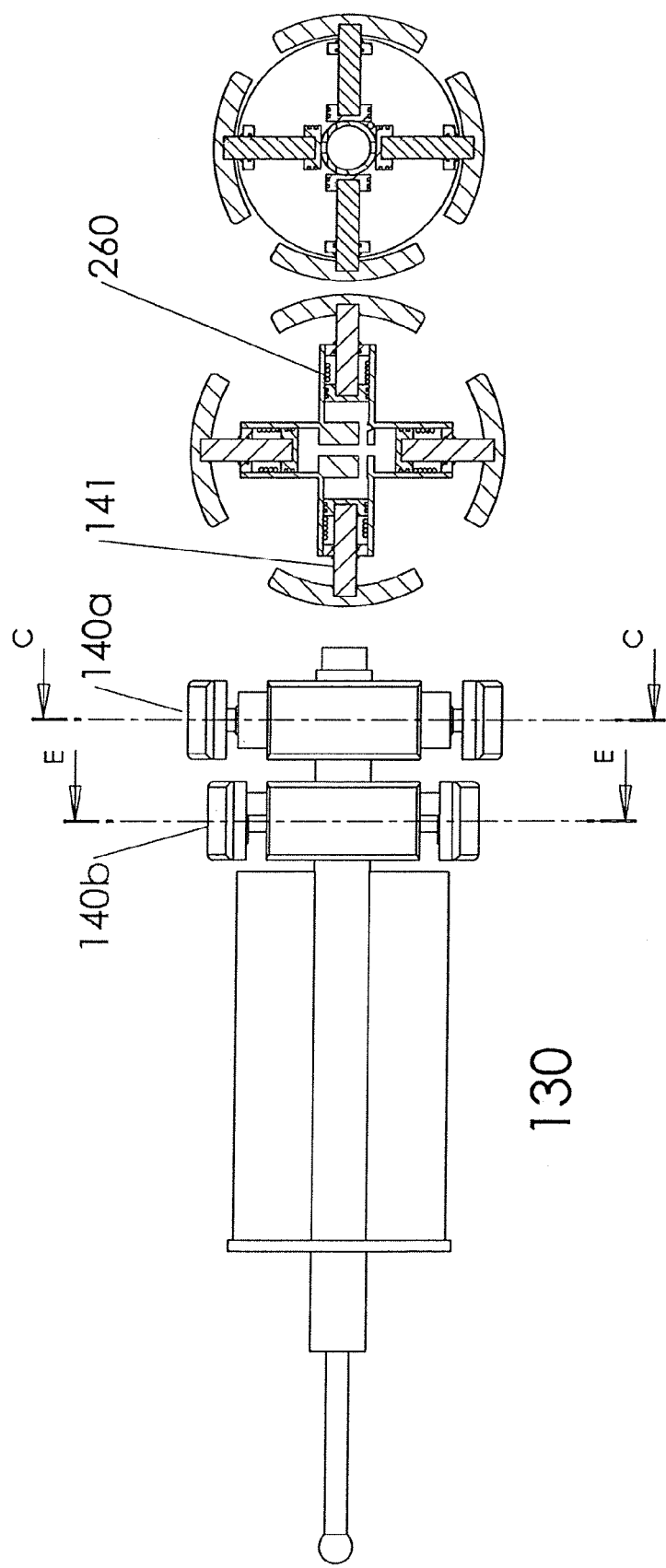
FIG. 5C is a side section view of System A of FIG. 5A.
FIG. 5D is a cross sectional view through section C-C of FIG. 5C.
FIG. 5E is a cross sectional view through section E-E of FIG. 5C.
Figure 6A:
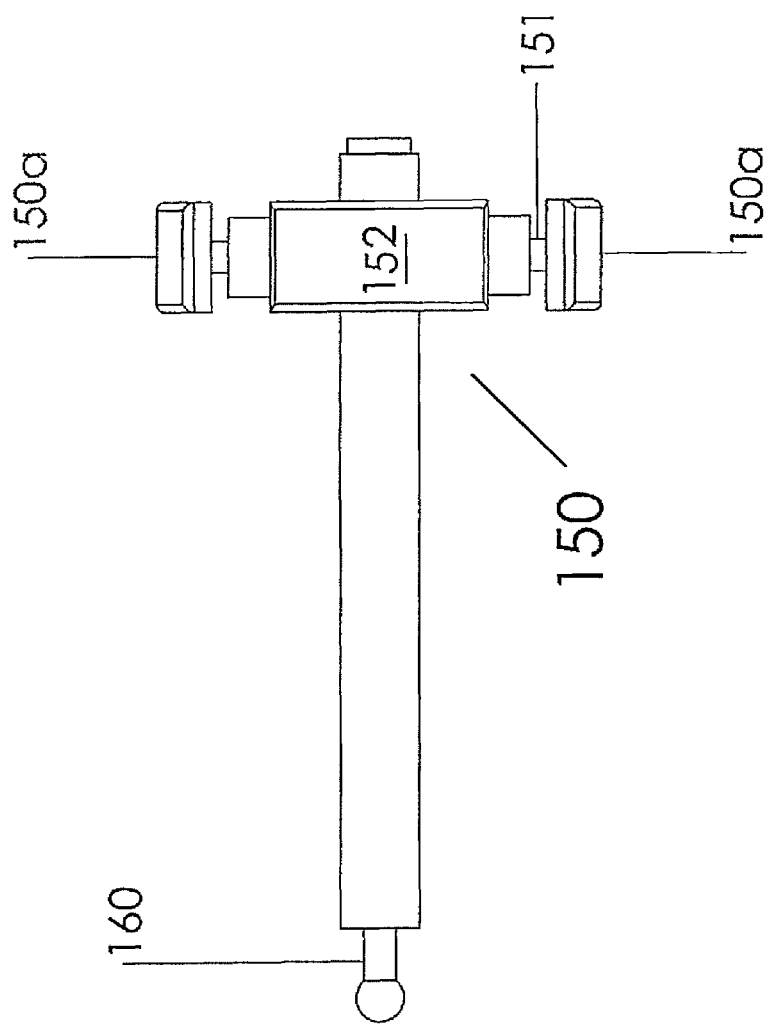
FIG. 6A is a side section view of the ninth hydraulic ram of the robotic unit of the buckle arrestor tool of the invention.
Figure 6B:
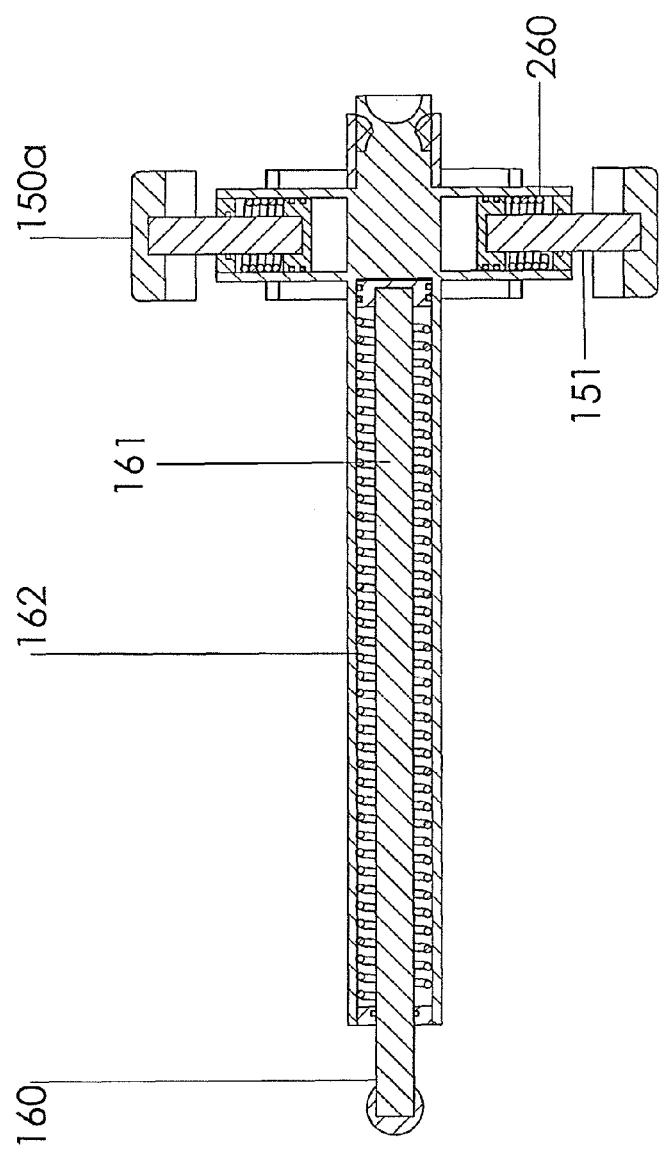
FIG. 6B is an enlarged cross-sectional view through section I-I of FIG. 6A.
Figure 7A:
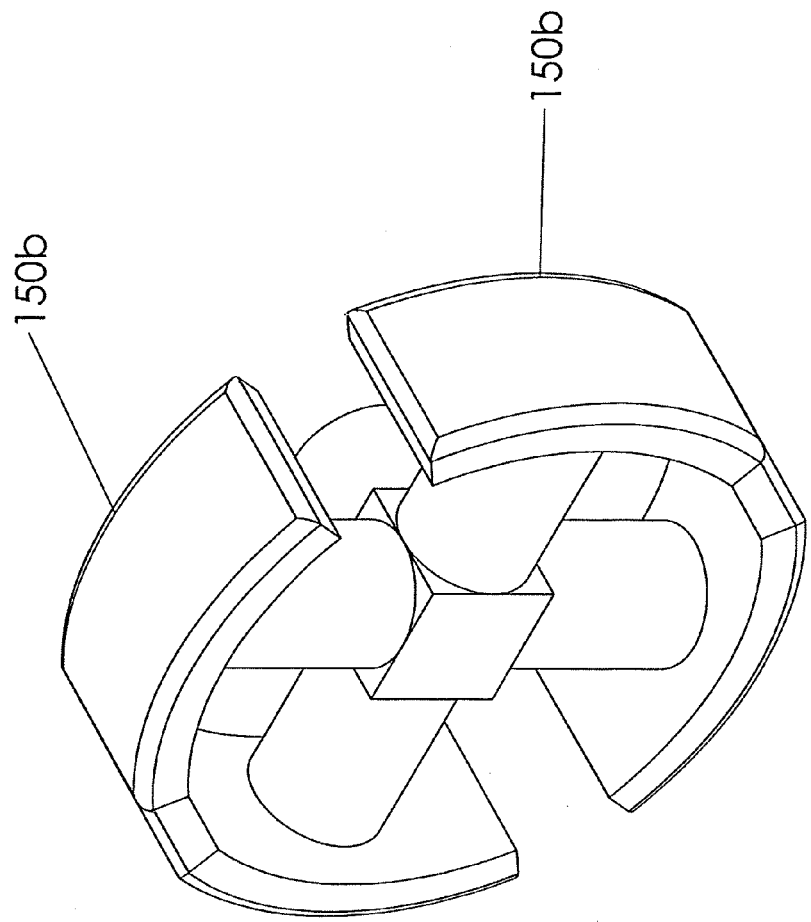
FIG. 7A is a perspective view of the axial rams and compression segment pads of the robotic tool of the invention.
Figure 7B:
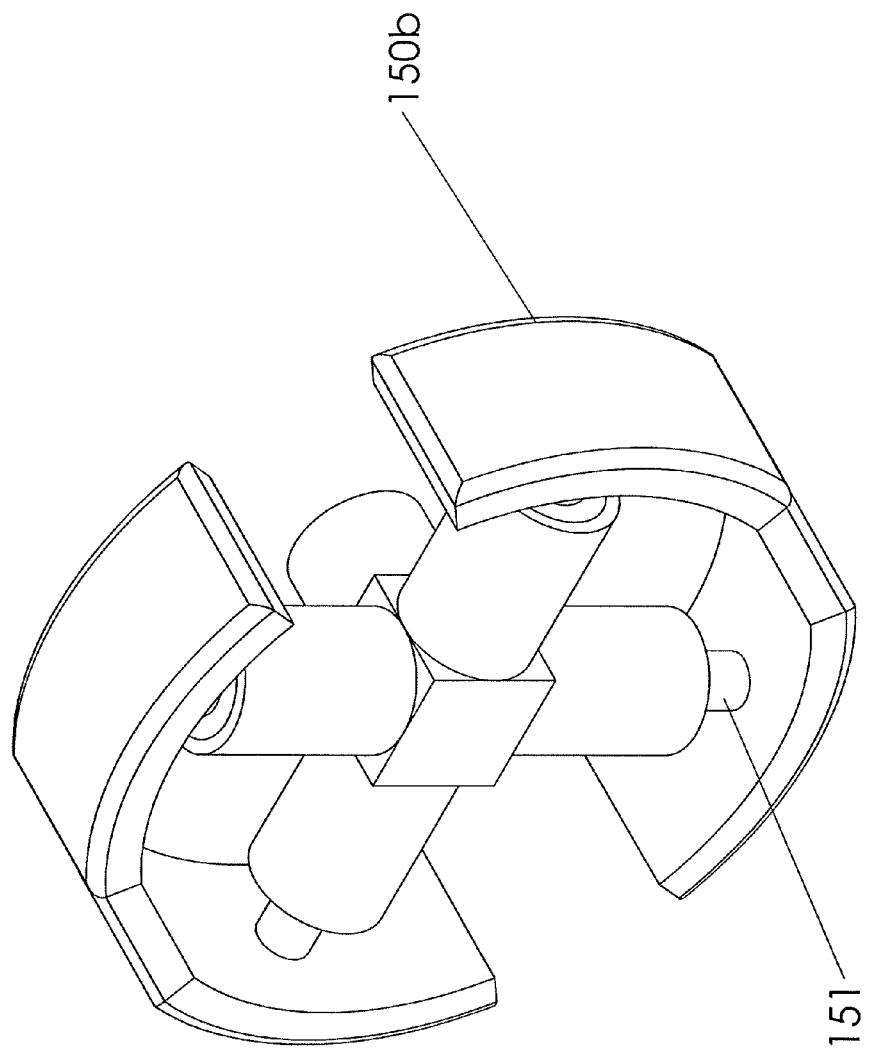
FIG. 7B is an end view of the axial rams and compression segment pads of the robotic unit FIG. 7A.
Figure 7C:
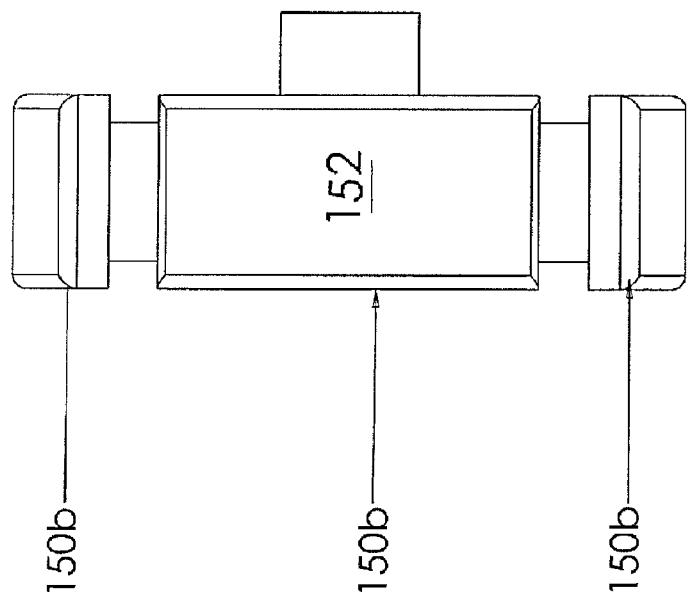
FIG. 7C is a side view of the axial rams and compression segment pads of FIG. 7A.

Referring specifically to FIGS. 4 and 5A to 5E, system X has eight axial rams 140 configured in two rings of four rams 140a and 140b respectively, which are placed at equidistant positions apart in a circular ring arrangement such that the angle between each consecutive axial ram in the ring arrangement is approximately 90°. In this example, if comparing the ring arrangement to a clock, the axial rams 140a and 140b would occupy positions at 12, 3, 6 and 9 o'clock (FIGS. 5D and 5E). Similarly, system Y is also provided with eight axial rams 150 configured in two rings each comprising four rams 150a and 150b respectively (FIGS. 7A to 7C). The rams 150a and 150b are also positioned equidistant positions apart in a circular ring arrangement in the same way as rams 140a and 140b. Each of the axial rams 140 and 150 are provided with rubber soled compression segment pads (Gekos) 142 and 152 positioned substantially perpendicularly to the axial rams 140 and 150 respectively. The gekos 142 and 152 follow the natural contour of the interior surface of the pipeline wall, such that the profile of each geko matches the interior curvature of the inner surface of the pipeline wall. The gekos 142 and 152 are each threaded to achieve the maximum grip possible.

Each of the eight compression segment pads 142 on axial rams 140a and 140b respectively are manipulated into the required position by eight separate hydraulically driven pistons 141 (FIG. 5d). Once the pistons have travelled the desired/required distance as determined by the piston 141 the respective segment pads 140a or 140b engage and lock onto the pipe wall by hydraulic compression means as appropriate. In use, only System X or System Y may function at any one time. One ring of four compression pads, for example compression pads 142 for ram 140a must be locked onto the pipe wall at any one time. It is understood that the compression segment pads 152 are also manipulated into the required position by separate hydraulically driven pistons 151 in a similar manner.

The pressure exerted by the axial compression pads 142 and 152 respectively on the inner surface of the pipeline wall are carefully calculated, to ensure sufficient compression is exerted on the pipeline wall whilst ensuring that the pressure exerted stays within allowable pipe hoop stress values. Furthermore, when offshore pipelines are internally painted with a flow enhancing finish, it makes it extremely difficult for anything to cling to the wall, nonetheless the compression pads use a standard opposing forces principles to overcome the problems associated with Teflon coated finishes.

In this embodiment of the invention the central processing unit 132 is further provided with a mechanism by which it can calculate the distance travelled from the number of piston strokes of the hydraulic ram system X or Y.

Figure 9A:
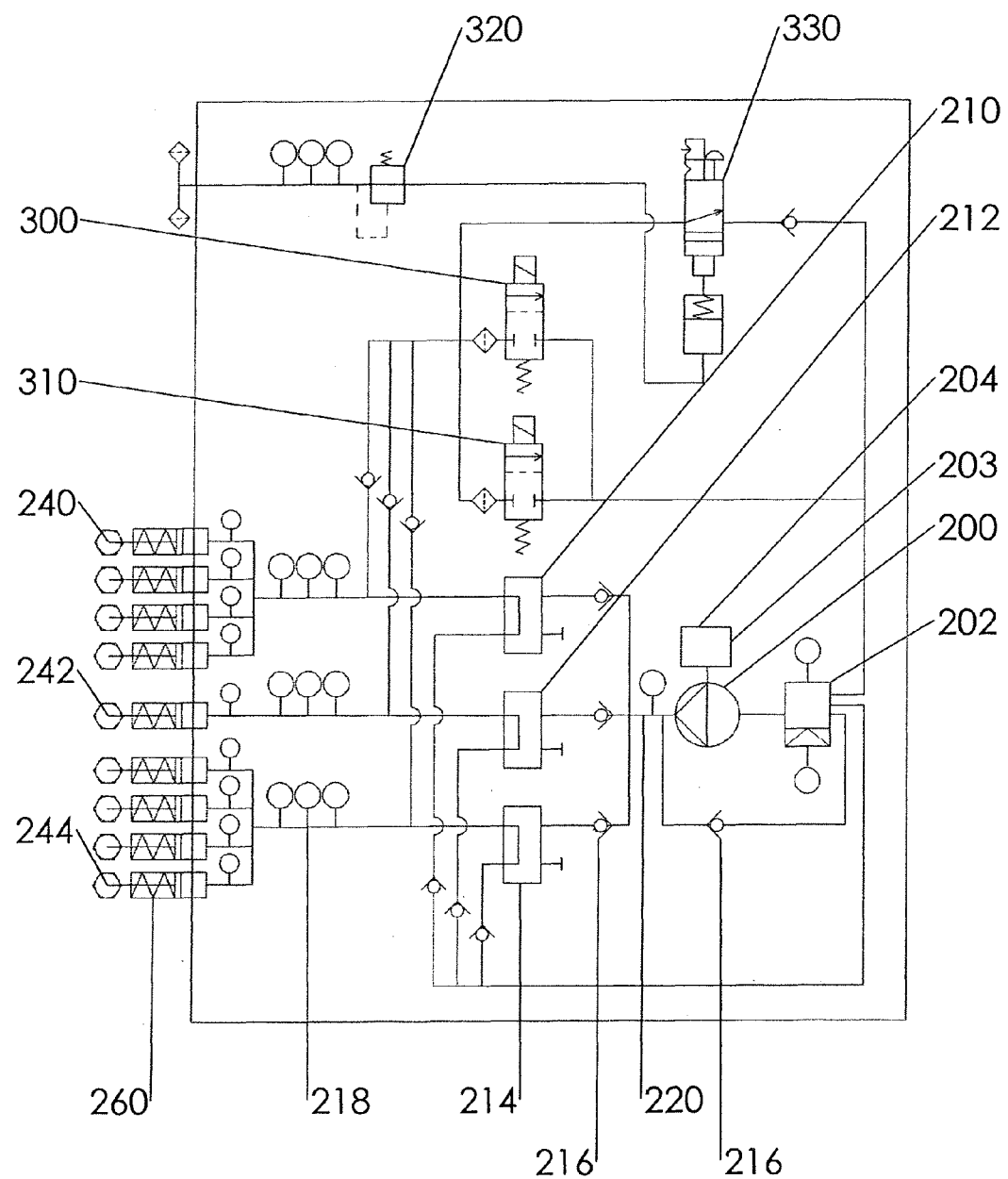
FIG. 9A is a schematic diagram of the hydraulic circuit of the main system.

Referring to FIG. 9A, there is shown a schematic diagram of the hydraulic circuit X. Each of the independent rams 140 within hydraulic system X plus the ninth longitudinal ram 160 are driven by hydraulic pump 200. Accumulator 202 is a pressurized reservoir which feeds oil into hydraulic pump 200. Hydraulic pump 200 is driven by a motor 203 and gearbox 204 and has a recycle loop with a check valve 216. For ease of reference, each grouping of four axial rams 140a and 140b correspond to axial hydraulic circuits 240 and 244 respectively. The ninth longitudinal ram 160 is marked as hydraulic circuit 242. Fluid line 220 from hydraulic pump 200 feeds into hydraulic pistons 141a, 161 and 141b through check valves 216a-c, controllers 210, 212 and 214 and pressure transmitters 218a-c respectively.

Figure 8B:
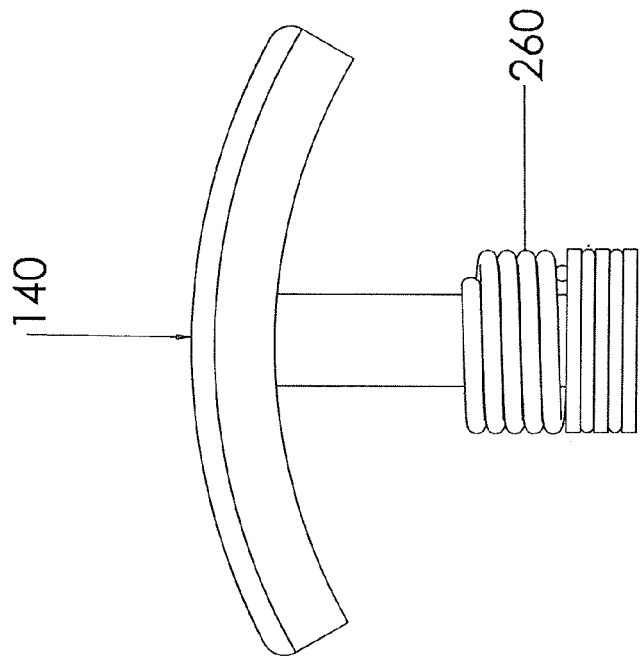
FIGS. 8A and 8B are a side view of an axial ram and compression segment pad of the robotic unit tool showing the stroke compression of the ram driving the axial ram and compression segment pad.
Figure 8A:
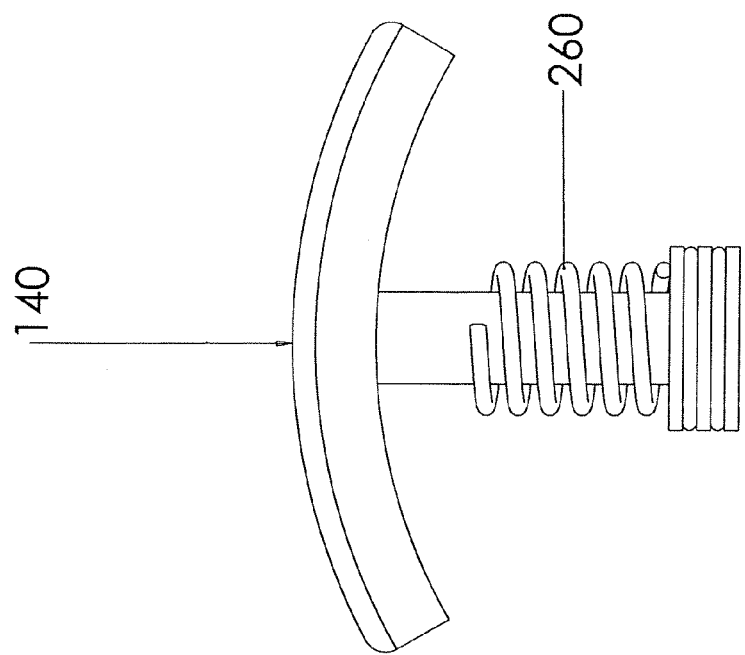

Each of the rams 140 on the hydraulic systems X and Y are fitted with a return spring 260 as shown in FIGS. 8A and 8B. The axial rams 140 have a reciprocating linear movement which is controlled by the hydraulic circuit 240, 244 and spring 260. Each axial hydraulic system 240 and 244 has a controller 210, 214 in the form of a lock out pressure valve. Such a pressure valve, allows each axial ram 140 to move into an extended position whilst preventing the axial rams 140 from exerting too much pressure or imparting excessive hoop stress into the pipe wall.

In use, as the axial rams 140 are moved outwards by hydraulic systems 240 and 244 towards the inner surface of the pipeline, spring 260 is compressed. When hydraulic fluid is released by the controllers 210 and 214, the compressed spring 260 recovers its memory drawing the axial ram 140 away from the pipeline wall. The controllers 210 and 214 are indexed to a certain point which ensures that the axial compression rams 140 do not exert excessive pressure onto the pipe wall.

The hydraulic circuit of the invention is also provided with a triple redundancy fail safe unset system which ensures that the device 8 of the invention does not get stuck within the pipeline itself. The triple redundancy fail safe unset system comprises an independent primary, secondary and tertiary unset system. The primary unset system is a normal independent unset system which is operated using an extremely low frequency (ELF) electrical unset system. The controllers 210, 212 and 214 are operated using ELF communications from a remote source to unload the hydraulic fluid back to the accumulator and thereby unlock the ram systems.

The secondary unset system comprises a hyperbaric or hydrostatic upset unset system whereby a pre-set integrated detenting pressure release valve 320 detects a hyperbaric spike. The pressure built up causes a piston to move which drives a shuttle within the detenting valve forward causing the integrated detenting valve 330 to deflect thereby releasing the pressure from the circuit.

The tertiary unset system comprises a timed decay unset system, whereby valve 300 is triggered to depressurize the circuit once a predetermined measure has been reached, for example a 10 day countdown.

The ninth ram 160 with hydraulically driven piston 161 and return spring 162 (FIGS. 6A and 6B) is longitudinal, is located in the center of the control pod, and is the motive force for driving the robotic unit 10 up or down the pipeline. Ram 160 is referred to as middle for the purposes of the sequencer process table below. The first set of axial compression segment pads 152 are referred to as bottom for the purposes of the sequencer process table below.

Figure 11:
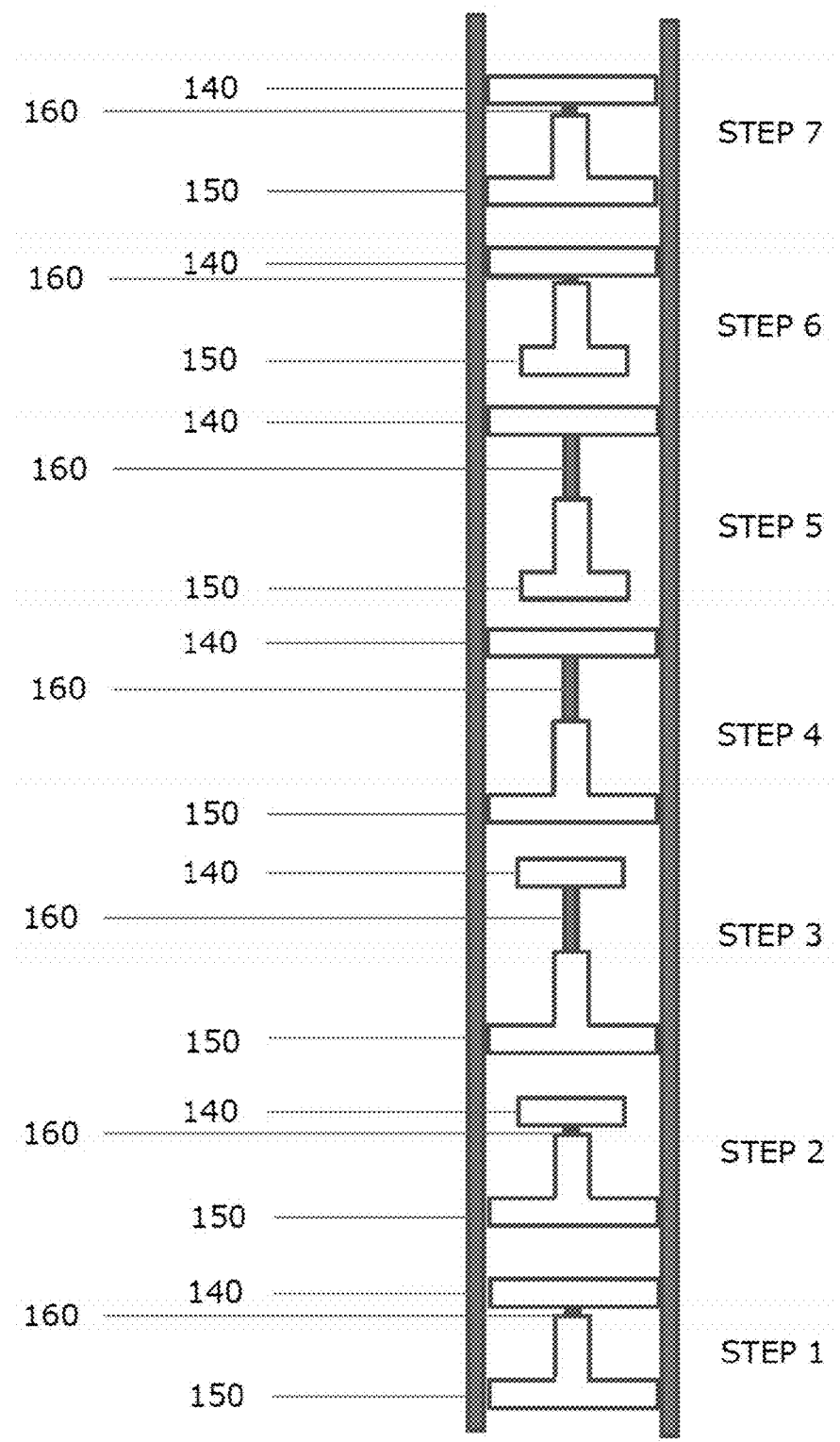
FIG. 11 is a flow diagram showing the sequential steps of the robotic unit of the invention as it moves within a pipeline.

The second set of axial compression segment pads 140 are referred to as top for the purposes of the sequencer process table below. Control of movement of the robotic unit 10 up or down the pipeline is managed by use of a sequencer process. An example of how the logic works is presented in the sequencer process table below. Movement of the robotic unit 10 will now be described with reference to the Sequenser Process Table below and FIG. 11;

| | Sequenser Process Table | | | |
|---|---|---|---|---|
| Step | Bottom | Middle | Top | Remarks |
| 1 | Extended Axial compression segment pads 152 are extended and engage with the inner surface of the pipeline wall. | Retracted Ninth ram 160 is retracted. | Extended Axial compression segment pads 142 are extended and engage with the inner surface of the pipeline wall. | No movement |
| CHECK CONDITION | | | | |
| 2 | Extended Axial compression segment pads 152 are extended and engage with the inner surface of the pipeline wall. | Retracted Ninth ram 160 is retracted | Retracting Axial compression segment pads 142 are disengaging with the inner surface of the pipeline wall. | Moving Retracting Top pads 142 move away from pipe wall. Robotic unit is held on by bottom pads 152. |
| 3 | Extended Axial compression segment pads 152 remain extended and engaged with the inner surface of the pipeline wall. | Extending Ninth ram 160 is extending | Retracted Axial compression segment pads 142 remain retracted. | Moving Extending main cylinder to push rapid set isolation tool up pipe on ninth ram 160. Robotic unit is locked on by bottom pads 152. |
| 4 | Extended Axial compression segment pads 152 remain extended and engage with the inner surface of the pipeline wall. | Extended Ninth ram 160 is extended. | Extending Axial compression segment pads 142 are extended and engage with the inner surface of the pipeline wall. | Moving Top pads 142 back onto pipe wall in new higher position. Robotic unit is locked on with top 142 and bottom 152 pads |
| CHECK CONDITION | | | | |
| 5 | Retracting Axial compression segment pads 152 are disengaging with the inner surface of the pipeline wall. | Extended Ninth ram 160 is extended | Extended Axial compression segment pads 142 remain extended and engaged with the inner surface of the pipeline wall. | Moving Bottom pads 152 are lifted off pipe wall. Robotic unit is locked on by top pads 142 |
| 6 | Retracted Axial compression segment pads 152 remain retracted | Retracting Ninth ram 160 is retracting | Extended Axial compression segment pads 142 remain extended and engaged with the inner surface of the pipeline wall. | Moving Main longitudinal ram is used to pull robotic unit up the pipeline to next step. Robotic unit is locked on by top pads 142 |
| 7 | Extending Axial compression segment pads 152 are extended and engage with the inner surface of the pipeline wall. | Retracted Ninth ram 160 is retracted | Extended Axial compression segment pads 142 remain extended and engaged with the inner surface of the pipeline wall. | Moving Bottom pads 152 are extended back onto pipe wall at new higher position. Robotic unit is locked on with top 142 and bottom 152 pads |
| CHECK CONDITION Back To Step 1 again | | | | |
| 1 | Extended Axial compression segment pads 152 are extended and engage with the | Retracted Ninth ram 160 is retracted. | Extended Axial compression segment pads 142 are extended and engage with the | No movement Robotic unit is locked on all 9 hydraulic rams 142 and 152 and 160 |

Sequenser Process Table

| Step | Bottom | Middle | Top | Remarks |
|---|---|---|---|---|
| | inner surface of the pipeline wall. | | inner surface of the pipeline wall. | Ready to start next full sequence |

Although not shown, the robotic unit 10 can also be fitted with backup pigging disks, to enable it to be pigged out of the pipeline, by a propelled chaser pig if so desired.

It will of course be understood that the invention is not limited to the specific details described herein which are given by way of example only and that various modifications and alterations are possible without departing from the scope of the invention.

The invention claimed is:

1. An autonomous self propelled internal buckle arresting pipeline isolation tool comprising;
    a robotic unit coupled to an internal buckle arresting pipeline isolation tool, wherein the robotic unit operates without an umbilical or tether for controlling or communicating with the robotic unit from a remote location, the robotic unit comprising a control pod, a first end and a second end, the first and second ends being separable from each other; a hydraulic system comprising two hydraulic ram systems, wherein the control pod is disposed between the two hydraulic ram systems and wherein each of the two hydraulic ram systems comprises at least one hydraulic piston and means for operating the at least one hydraulic piston, each of the two hydraulic ram systems of the hydraulic system being independently operable to returnably separate the first and second ends of the robotic unit whereby the hydraulic system further comprising a plurality of pipeline engaging means positioned along an exterior surface of the robotic unit, the plurality of pipeline engaging means being operable by the hydraulic system to be engagable with an interior surface of a pipeline; and a control unit in the control pod, the control unit being in communication with the hydraulic system to control the movement of the plurality of pipeline engaging means and the first and second ends;
    the internal buckle arresting pipeline isolation tool comprising a module having gripping and sealing members encircling the module in communication with a second hydraulic system comprising at least one internal buckle arresting pipeline isolation tool hydraulic piston; an internal buckle arresting pipeline isolation tool control unit in communication with one or more sensors and an actuator positioned within the isolation tool, the gripping and sealing members being movable between an unset position in which the gripping and sealing members are in an unexpanded configuration and a set position in which the gripping and sealing members are in an expanded configuration whereby the internal buckle arresting pipeline isolation tool control unit operates the actuator to move the at least one internal buckle arresting pipeline isolation tool hydraulic piston such that the gripping and sealing members are moved between an unset position and a set position,
    the robotic unit being coupled to the internal buckle arresting pipeline isolation tool such that the robotic unit propels the internal buckle arresting pipeline isolation tool inside the pipeline.

2. The autonomous self propelled internal buckle arresting pipeline isolation tool as claimed in claim 1, wherein the control unit of the robotic unit is provided with at least one microprocessor.

3. The autonomous self propelled internal buckle arresting pipeline isolation tool as claimed in claim 2, wherein the control unit of the robotic unit is provided with at least two microprocessors, and wherein the at least two microprocessors are programmed with an embedded software program.

4. The autonomous self propelled internal buckle arresting pipeline isolation tool as claimed in claim 1, wherein the control unit of the robotic unit further comprises a communications module which enables the hydraulic system to utilize extremely low frequency ("ELF") communications.

5. The autonomous self propelled internal buckle arresting pipeline isolation tool as claimed in claim 1, wherein each hydraulic ram system of the robotic unit comprises a plurality of hydraulic rams, wherein at least one of the plurality of rams is an axial ram, wherein the two separate hydraulic ram systems are connected to a longitudinal ram, and wherein the axial rams and longitudinal ram are arranged such that the axial rams and the longitudinal ram are perpendicular to one another.

6. The autonomous self propelled internal buckle arresting pipeline isolation tool as claimed in claim 5, wherein the means for operating the hydraulic system of the robotic unit comprises a pump for operating the plurality of hydraulic rams or pistons, means for operating the pump, a plurality of fluid pipelines positioned between the pump and the plurality of hydraulic rams and an accumulator positioned in parallel with the pump.

7. The autonomous self propelled internal buckle arresting pipeline isolation tool as claimed in claim 1, wherein each hydraulic ram system of the robotic unit comprises at least nine rams wherein at least eight rams are axial rams and at least one ram is a longitudinal ram.

8. The autonomous self propelled internal buckle arresting pipeline isolation tool as claimed in claim 1, wherein each of the two hydraulic ram systems of the robotic unit are arranged such that standard opposing forces principles enable each of the hydraulic ram systems to engage with the interior surface of the pipeline such that the robotic unit remains in position within the pipeline regardless of the inclination of the pipeline or whether or not the interior surface of the pipeline is coated.

9. The autonomous self propelled internal buckle arresting pipeline isolation tool as claimed in claim 1, wherein each hydraulic ram system of the robotic unit comprises a plurality of axial hydraulic rams, and wherein each of the axial hydraulic rams is provided with a coated compression pad.

10. The autonomous self propelled internal buckle arresting pipeline isolation tool as claimed in claim 9, wherein the compression pad is coated with a surface which is tactile which promotes adhesion to the interior surface.

11. The autonomous self propelled internal buckle arresting pipeline isolation tool as claimed in claim 9, wherein the compression pad is a rubber coated compression pad.

12. The autonomous self propelled internal buckle arresting pipeline isolation tool as claimed in claim 9, wherein the compression pad is a threaded compression pad.

13. The autonomous self propelled internal buckle arresting pipeline isolation tool as claimed in claim 1, wherein the hydraulic system of the robotic unit is provided with a hydraulic circuit and comprises one or more check valves and one or more controllers which control the flow of hydraulic fluid around the hydraulic circuit to control movement of the pipeline engaging means and the first and second ends such that the robotic unit propels the pipeline isolation tool along the inside of a pipeline.

14. The autonomous self propelled internal buckle arresting pipeline isolation tool as claimed in claim 13, wherein the check valves and the one or more controllers of the robotic unit are arranged in such a way to achieve a triple redundancy fail safe unset system.

15. The autonomous self propelled internal buckle arresting pipeline isolation tool as claimed in claim 1, wherein the robotic unit comprises a coupling mechanism for connecting one or more further pipeline tools or other technical equipment to the pipeline tool.

16. The autonomous self propelled internal buckle arresting pipeline isolation tool as claimed in claim 15, wherein the coupling mechanism comprises one or more selected from the group comprising a double articulating ball and socket joint, a flexing spring joint, and a double acting universal joint.

17. The autonomous self propelled internal buckle arresting pipeline isolation tool as claimed in claim 1, wherein internal buckle arrestor isolation tool is an isolation plug system that initiates in approximately 2.5 seconds.

18. The autonomous self propelled internal buckle arresting pipeline isolation tool as claimed in claim 17, wherein a setting mode is initiated by a gas charge having a high coefficient of expansion whereby the isolation tool is capable of rapid expansion to grip and seal the pipeline thereby preventing flooding of the pipeline.

19. The autonomous self propelled internal buckle arresting pipeline isolation tool as claimed in claim 1, wherein the at least one hydraulic piston is coupled to a plurality of fluid pipelines which are connected in a manner which enables the gripping and sealing members to operate to seal the pipeline.

20. The autonomous self propelled internal buckle arresting pipeline isolation tool as claimed in claim 1, wherein the at least one hydraulic piston of the internal buckle arresting pipeline isolation tool is a hydraulic energised or a stored hydraulic accumulator driven hydraulic piston.

21. The autonomous self propelled internal buckle arresting pipeline isolation tool as claimed in claim 1, wherein the actuator of the internal buckle arresting pipeline isolation tool is selected from one or more of a high pressure gas, hydraulic and electric storage actuator positioned within the isolation tool in communication with the at least one hydraulic piston of the hydraulic system.

22. The autonomous self propelled internal buckle arresting pipeline isolation tool as claimed in claim 1, wherein the pipeline has a hoop and the sealing member of the internal buckle arresting pipeline isolation tool comprises a rubber packer and the gripping member comprises a material which is designed to keep the hoop of the pipeline and Von Mises stresses below 72% of specified minimum yield strength (SMYS).

23. The autonomous self propelled internal buckle arresting pipeline isolation tool as claimed in claim 1, wherein the buckle arresting isolation tool and the robotic unit are made from a material with a high strength to weight ratio.

24. The autonomous self propelled internal buckle arresting pipeline isolation tool as claimed in claim 1, wherein the pipeline isolation tool comprises a wheeled mechanical isolation plug.

25. The autonomous self propelled internal buckle arresting pipeline isolation tool as claimed in claim 1, wherein a mechanical isolation plug is located at the first end of the robotic unit.

26. The autonomous self propelled internal buckle arresting pipeline isolation tool as claimed in claim 1, wherein the one or more sensors are selected from the group of pressure, moisture and differential detectors.

27. The autonomous self propelled internal buckle arresting pipeline isolation tool as claimed in claim 26, wherein the one or more sensors comprise one or more sensor systems with at least three sensors, and wherein the sensor systems are provided with redundancy voting whereby in the event of any change or alteration to a prevailing condition, then a conditional change to two out of each three sensors, will dictate a new status and the control unit of the pipeline isolation tool will react to the new status.

* * * * *